United States Patent [19]

Uchiyama et al.

[11] Patent Number: 5,020,550

[45] Date of Patent: Jun. 4, 1991

[54] APPARATUS FOR EXPANDING MATERIAL OF AN AGRICULTURAL ORIGIN

[75] Inventors: Kensuke Uchiyama; Hiromi Uematsu; Manabu Takeuchi, all of Hiratsuka; Masao Kobari, Tokyo, all of Japan

[73] Assignee: Japan Tobacco Inc., Tokyo, Japan

[21] Appl. No.: 329,782

[22] PCT Filed: Jul. 27, 1988

[86] PCT No.: PCT/JP88/00750

§ 371 Date: Mar. 23, 1989

§ 102(e) Date: Mar. 23, 1989

[87] PCT Pub. No.: WO89/00821

PCT Pub. Date: Feb. 9, 1989

[30] Foreign Application Priority Data

Jul. 27, 1987 [JP] Japan .................. 62-185427

[51] Int. Cl.⁵ ................................ A24B 3/18
[52] U.S. Cl. ............................ 131/296; 131/291
[58] Field of Search ............. 131/296, 900; 426/447, 426/449, 445; 99/323.4, 323.9

[56] References Cited

U.S. PATENT DOCUMENTS

| | | | |
|---|---|---|---|
| 3,612,066 | 10/1971 | Jones et al. | 131/143 |
| 3,693,631 | 9/1972 | Moore et al. | 131/296 |
| 3,955,486 | 5/1976 | Strommer | 99/323.4 |
| 4,235,250 | 11/1980 | Utsch | 131/296 |
| 4,258,729 | 3/1981 | de la Burde et al. | 131/140 |
| 4,333,483 | 6/1982 | de la Burde et al. | 131/352 |
| 4,460,000 | 7/1984 | Steinberg | 131/296 |
| 4,697,604 | 10/1987 | Brown et al. | 131/296 |
| 4,821,747 | 4/1989 | Stuhl et al. | 131/296 |

FOREIGN PATENT DOCUMENTS

| | | |
|---|---|---|
| 45-11999 | 3/1970 | Japan . |
| 49-1879 | 1/1974 | Japan . |
| 592829 | 8/1980 | Japan . |
| 2115677 | 9/1983 | United Kingdom ........ 131/296 |

Primary Examiner—V. Millin
Assistant Examiner—Jennifer L. Doyle
Attorney, Agent, or Firm—Nixon & Vanderhye

[57] ABSTRACT

An expanding apparatus of this invention includes a preparatory vessel that is supplied with material of agricultural origin, for example, tobacco material. The tobacco material in the preparatory vessel is supplied to an impregnation vessel through a convey pipe. Carbon dioxide having an impregnation pressure is supplied to the impregnation vessel so as to fill the same. A booster mechanism is associated with the convey pipe to increase the pressure of carbon dioxide around the tobacco material to a pressure substantially equal to the impregnation pressure in the impregnation vessel when the tobacco material is supplied from the preparatory vessel to the impregnation vessel. The tobacco material impregnated in the impregnation vessel is discharged to a blow pipe through a delivery pipe and is expanded by means of a heating medium generated in the blow pipe. A debooster mechanism is associated with the delivery pipe to reduce the pressure of carbon dioxide around the tobacco material to a pressure substantially equal to the pressure in the blow pipe when the impregnated material is discharged from the impregnation vessel to the blow pipe.

16 Claims, 10 Drawing Sheets

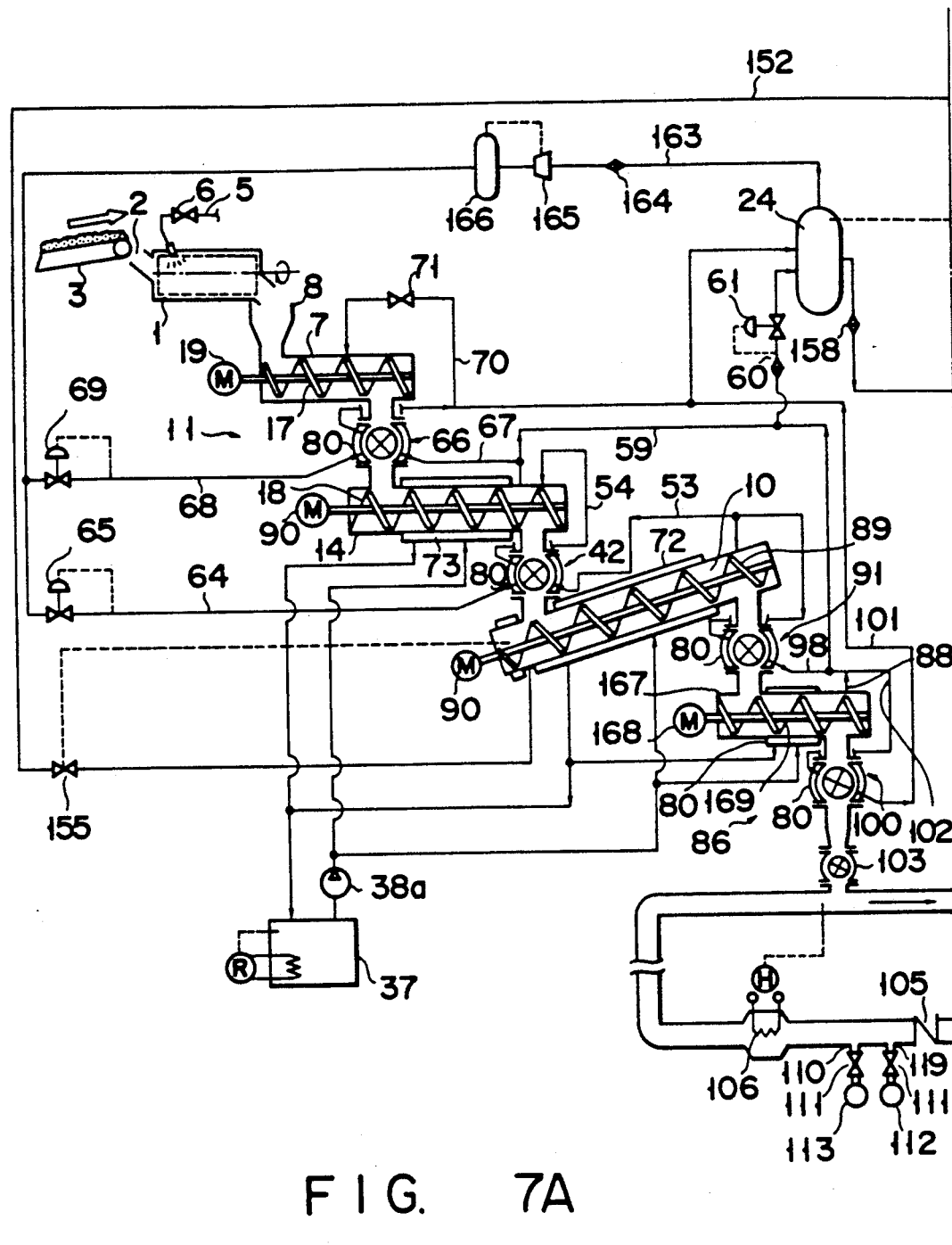
F I G. 7A

APPARATUS FOR EXPANDING MATERIAL OF AN AGRICULTURAL ORIGIN

FIELD OF THE INVENTION

The present invention relates to an apparatus for expanding materials of an agricultural origin, and more particularly, to an apparatus for expanding tobacco material.

BACKGROUND AND SUMMARY OF THE INVENTION

Tobacco is an example of one agricultural material that is cultivated and harvested. Harvested tobacco leaves have a relatively high water content and thus cannot be used directly to manufacture a commercial tobacco product. For this reason, the harvested tobacco leaves are dried so as to remove moisture therefrom. In general, therefore, only dried tobacco leaves may be preserved or used to manufacture a commercial tobacco product.

Tobacco leaves however, shrink extremely when they are dried. The tobacco material manufactured from such dried tobacco leaves also experiences shrinkage (i.e. reduction in volume). If tobacco material of reduced volume is used to manufacture cigarettes, for example, the amount of tobacco material per cigarette must be increased thereby deleteriously affecting cigarette productivity.

Due to the above circumstances, therefore, the dried tobacco material is expanded to increase the volume of the tobacco material, prior to use of the tobacco material to manufacture cigarettes, thereby improving cigarette productivity.

Conventional apparatus for expanding tobacco material are described in Japanese Patent Publication No. 49-1879 and Japanese Patent Disclosure (Kokai) No. 50-107197. The apparatus described in Japanese Publication No. 49-1879 includes an impregnation vessel used to impregnate the tobacco material with an organic solvent. More specifically, organic solvent is separated into liquid and gaseous phases. The tobacco material in the impregnation vessel is first dipped in the liquid-phase organic solvent, and then subsequently is contacted with the gaseous-phase organic solvent. The tobacco material impregnated with organic solvent is removed from the impregnation vessel and is heated. Upon heating, organic solvent contained in the impregnated tobacco material is evaporated as a gas from the tobacco material. By the evaporation of organic solvent, the tobacco material is expanded.

In the apparatus disclosed in Japanese Patent Disclosure (Kokai) No. 50-107197, liquefied carbon dioxide is used as an expanding agent in order to expand the tobacco material. In the expanding apparatus disclosed in Japanese Patent Publication No. 50-107197 the principle of expanding the tobacco material is the same as that in Japanese Patent Publication No. 49-1879 discussed above. In this regard, tobacco material impregnated with carbon dioxide is heated to evaporate carbon dioxide gas from the tobacco material, and thereby expand the tobacco material.

Since the expanding apparatus disclosed in Japanese Patent Publication No. 49-1879 uses liquefied organic solvent as an expanding agent, the internal pressure of the impregnation vessel required to impregnate the tobacco material with organic solvent can be relatively low. In such a apparatus using liquefied organic solvent, the tobacco material can be charged continuously in the impregnation vessel so as to impregnate the tobacco material with organic solvent, and thus expansion of the tobacco material can be continuously performed.

Freon TM halogenated hydrocarbons are conventionally used as expanding agents. However, since Freon TM hydrocarbons are a known environmental pollutant, the amount of Freon TM hydrocarbon production has recently been decreased, with the result being that the cost of Freon TM has increased. For this reason, when an expanding apparatus using Freon TM hydrocarbon is employed in the tobacco production line, the cost of such tobacco is inevitably increased with an increase in the cost of the Freon TM hydrocarbons.

The expanding apparatus described in Japanese Patent Disclosure (Kokai) No. 50-107197 uses liquefied carbon dioxide in place of Freon TM halogenated hydrocarbons as an expanding agent. Although the disadvantages of Freon TM can be eliminated, the advantage thereof (i.e., a continuous treatment) is lost. When carbon dioxide as an expanding agent is used to impregnate the tobacco material to a desired level, the internal pressure of the impregnation vessel (i.e., the pressure of carbon dioxide) must be kept at a high pressure regardless of the liquid- and gaseous-phase carbon dioxide. For this reason, in expanding apparatus using carbon dioxide, the internal pressure of the impregnation vessel must be kept at a high pressure. In addition, the tobacco material to be expanded cannot be continuously charged into the impregnation vessel. As a result, in the expanding apparatus using carbon dioxide, the expansion treatment is inevitably a batch process. Therefore, such an apparatus is not suitable for expanding a large amount of tobacco material. When carbon dioxide is used as an expanding agent, the amount of carbon dioxide impregnated in the tobacco material is relatively small. For this reason, the tobacco material impregnated with carbon dioxide must be immediately heated, preferably within two minutes. Otherwise, desired expansion of the tobacco material cannot be achieved. Under these circumstances, it is difficult to use the batch type expanding apparatus using carbon dioxide as an expanding agent in practical (i.e., industrial) applications.

When liquefied dioxide is used as an expanding agent, a large amount of dry ice is contained in the tobacco material removed from the impregnation vessel to the outer atmosphere. For this reason, a large amount of liquefied carbon dioxide is lost. The amount of carbon dioxide supplied to the impregnation vessel (i.e. the amount of carbon dioxide used) is inevitably increased. In addition, the tobacco material must be heated at a higher temperature during heating of the tobacco material.

It is an object of the present invention to provide an apparatus for expanding materials of agricultural origin, such as foodstuffs, and the like to be expanded, wherein carbon dioxide can be properly used as an impregnating agent, i.e., an expanding agent, and expansion of the material can be performed continuously.

In order to achieve the above object of the present invention, there is provided an apparatus for expanding material of agricultural origin, comprising a preparatory vessel which receives the material and is open to the outer atmosphere. Air in the preparatory vessel is substituted with a gaseous impregnating agent supplied from an impregnating agent source. The material in the preparatory vessel is introduced into an impregnation vessel through a convey pipe. An impregnating agent having a pressure higher than atmospheric pressure is supplied from the impregnating agent source so that the impregnation vessel is filled with the impregnating agent.

The expanding apparatus also comprises booster means for filling the impregnating agent in the convey pipe and boosting the pressure of the impregnating agent around the material to a pressure substantially equal to that in the impregnation vessel immediately before the supply of the material from the convey pip to the impregnation vessel, while the pressure in the impregnation vessel is kept unchanged.

One end of a delivery pipe is connected to the impregnation vessel to discharge the material impregnated with the impregnating agent in the impregnation vessel. The other end of the delivery pipe is connected to a blow pipe for conveying the impregnated material with air. A flow of a heating medium heated to a predetermined temperature is generated in the blow pipe.

The expanding apparatus also comprises a debooster means having a function opposite to that of the booster means. The debooster means fills the impregnating agent from the impregnating agent source in the delivery pipe and reduces the pressure of the impregnating agent around the impregnated material to a pressure substantially equal to that of the blow pipe, immediately before delivery of the impregnated material from the delivery pipe to the blow pipe, while the pressure of the impregnation vessel is kept unchanged.

According to the expanding apparatus of the present invention, the material is charged in the impregnation vessel from the preparatory vessel through the convey pipe and is impregnated in the impregnation vessel. The impregnated material is discharged from the impregnation vessel to the blow pipe through the delivery pipe. The impregnated material discharged in the blow pipe is heated by the heating medium flowing in the blow pipe while being conveyed by the flow of the heating medium. During blowing, the impregnated material is expanded. That is, the agent impregnated in the material is evaporated by heating of the material, and evaporation of the impregnating agent allows expansion of the material.

According to the expanding apparatus of the present invention as described above, the booster means is arranged to supply the material from the preparatory vessel to the impregnation vessel through the convey pipe, and the debooster means is arranged to discharge the impregnated material from the impregnation vessel to the blow pipe through the delivery pipe. Therefore, the material can be continuously supplied to the impregnation vessel or discharged therefrom while the pressure of the impregnation vessel is kept unchanged. Therefore, impregnation of the material can be continuously performed, and expansion of the impregnated material can also be continuously performed.

The pressure of the impregnation vessel can be kept unchanged although continuous impregnation in the impregnation vessel is performed. Therefore, carbon dioxide which requires a high impregnation pressure can be used as an impregnating agent.

BRIEF DESCRIPTION OF THE DRAWINGS

FIGS. 1A to 5 show a first embodiment of the present invention, in which:

FIGS. 1A and 1B are schematic views showing halves of an overall structure of an expanding apparatus according to the present invention;

FIGS. 2 to 5 are sectional views showing first to fourth rotary valves used in the expanding apparatus shown in FIG. 1, respectively;

FIGS. 7A and 7B are schematic views showing halves of an expanding apparatus according to a third embodiment of the present invention.

DETAILED DESCRIPTION OF THE PREFERRED EXEMPLARY EMBODIMENTS

An expanding apparatus according to one embodiment of the present invention will be described with reference to FIGS. 1 to 5.

Figure 1A:
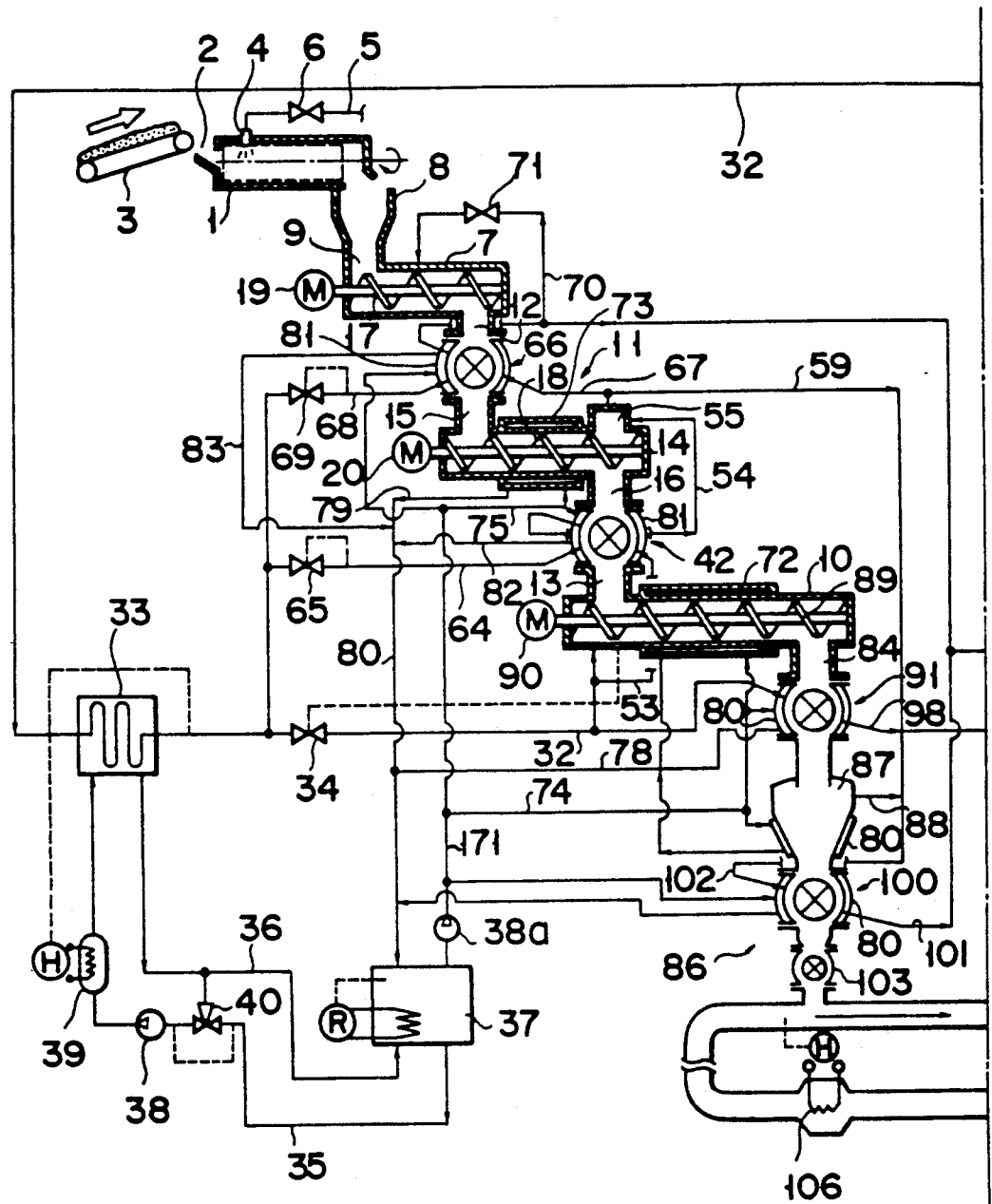
Figure 1B:
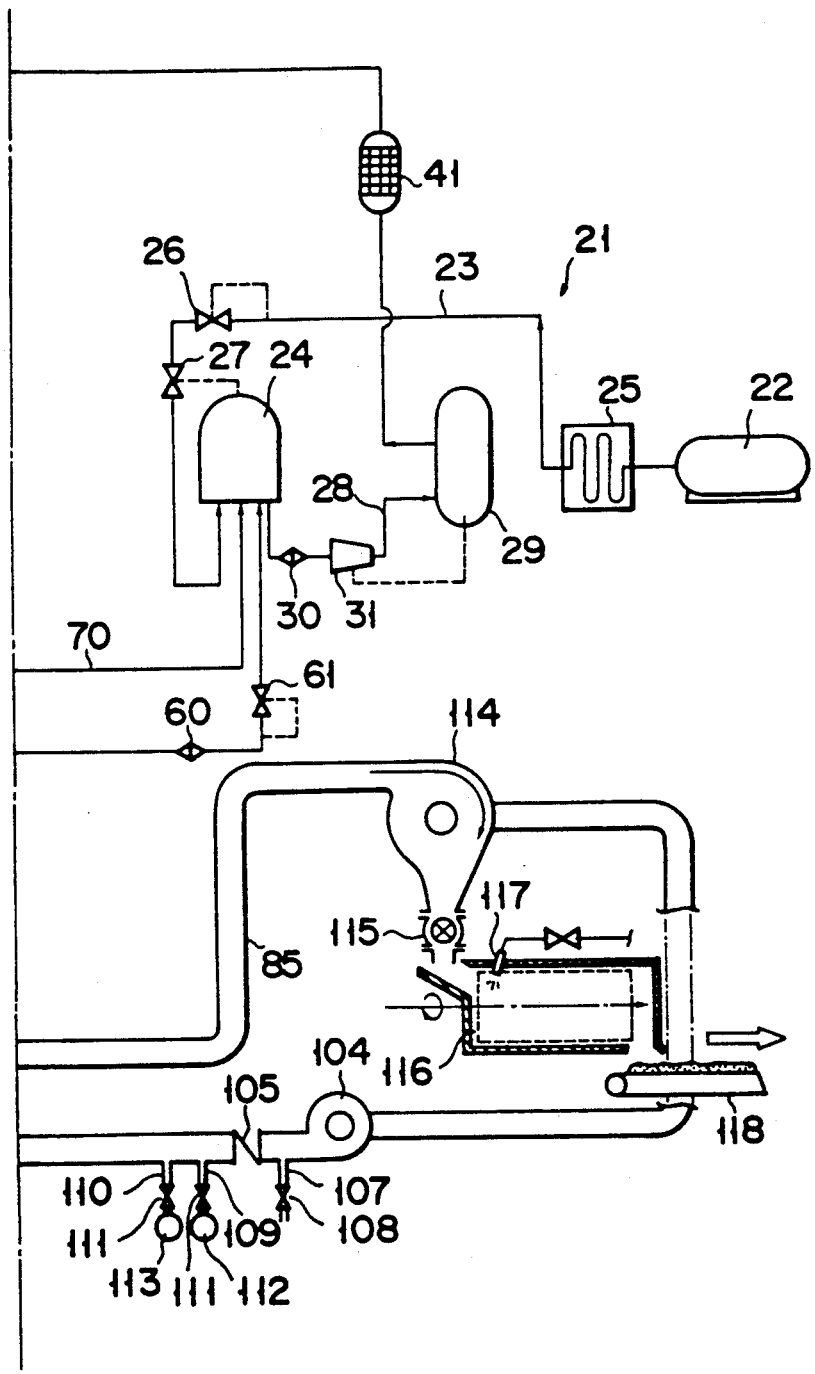

FIGS. 1A and 1B collectively shown an overall structure of the expanding apparatus according to the present invention. The expanding apparatus comprises humidifier 1 which is of the rotary drum type having a charging port 2 for receiving a material subjected to expansion, e.g., tobacco material. Conveyor 3 extends outside humidifier 1 near charging port 2 to convey the tobacco material. The tobacco material conveyed by conveyor 3 is charged in humidifier 1 through charging port 2. The tobacco material is prepared by cutting dried tobacco leaves into pieces each having a predetermined size. Humidifying nozzle 4 is disposed in humidifier 1. Nozzle 4 is connected to steam pipe 5, and steam pipe 5 is connected to a water/steam source (not shown) through a cover of humidifier 1. Water or steam is sprayed from humidifying nozzle 4 to the tobacco material supplied to humidifier 1. At the same time, the rotary drum of humidifier 1 is rotated around its axis, thereby appropriately dampening the tobacco material. Reference numeral 6 denotes an opening/closing valve arranged midway along steam pipe 5.

Preparatory vessel 7 is arranged below humidifier 1. Preparatory vessel 7 comprises a horizontally disposed cylindrical vessel. Vessel 7 receives the tobacco material discharged from humidifier 1 upon rotation of humidifier 1. Chute 8 is disposed near the other end of humidifier 1 to receive the charged tobacco material. Chute 8 is connected to reception port 9 formed at one end of preparatory vessel 7. Therefore, the tobacco material dampened in humidifier 1 can be fed from humidifier 1 to vessel 7 through chute 8 and reception port 9.

Impregnation vessel 10 is disposed below preparatory vessel 7. Vessel 10 comprises a cylindrical vessel in the same manner as preparatory vessel 7 and is disposed horizontally except that impregnation vessel 10 is a pressure vessel which can withstand high pressures.

Preparatory vessel 7 is connected to impregnation vessel 10 through convey pipe 11. The upper end of convey pipe 11 is connected to delivery port 12 formed at the other end of preparatory vessel 7. The lower end of pipe 11 is connected to reception port 13 formed at one end of impregnation vessel 10.

In the first embodiment, convey pipe 11 substantially comprises intermediate vessel 14, as is apparent from FIG. 1. Intermediate vessel 14 is a pressure vessel which has a cylindrical shape as in impregnation vessel 10 and disposed horizontally. Reception port 15 formed at one end of intermediate vessel 14 is connected to delivery port 12 of preparatory vessel 7. Delivery port 16 formed at the other end of intermediate vessel 14 is connected to reception port 13 of impregnation vessel 10.

Screw conveyors 17 and 18 are disposed in preparatory and intermediate vessels 7 and 14, respectively. Screw conveyors 17 and 18 can be rotated by motors 19 and 20 having reduction gear mechanisms, respectively. Screw conveyors 17 and 18 constitute part of a convey mechanism for conveying the tobacco material from preparatory vessel 7 to impregnation vessel 10 through intermediate vessel 14. More specifically, the tobacco material in preparatory vessel 7 is conveyed to delivery port 12 upon rotation of screw conveyor 17 and is then supplied from delivery port 12 to intermediate vessel 14 through its reception port 15. The tobacco material thus supplied to intermediate vessel 14 is conveyed to delivery port 16 upon rotation of screw conveyor 18 and is then supplied from delivery port 16 to impregnation vessel 10 through its reception port 13.

The expanding apparatus comprises impregnating agent source 21 for supplying an impregnating gas such as carbon dioxide gas. Source 21 comprises storage tank 22 for storing liquefied carbon dioxide. Tank 22 is connected to recovery gas holder 24 through pipe 23. Evaporator 25, pressure reducing valve 26, and level adjusting valve 27 are inserted in pipe 23 from the side of tank 22. Evaporator 25 evaporates liquefied carbon dioxide supplied from tank 22. Therefore, carbon dioxide gas is supplied to recovery gas holder 24 through pipe 23.

The pressure of carbon dioxide gas supplied to recovery gas holder 24 is reduced to a predetermined level by pressure reducing valve 26. Level adjusting valve 27 opens or closes pipe 23 in accordance with a level of a diaphragm which defines a chamber in holder 24, thereby maintaining the level of the diaphragm at a predetermined level.

Recovery gas holder 24 is connected to gas tank 29 through pipe 28. Strainer 30 and booster 31 are inserted in pipe 28 from the side of recovery gas tank 24. Booster 31 is actuated in accordance with a pressure in gas tank 29. The pressure of carbon dioxide gas in gas tank 29 is maintained at a predetermined pressure level or higher, i.e., an impregnation pressure or higher of carbon dioxide gas to be supplied to impregnation vessel 10.

Gas tank 29 is connected to impregnation vessel 10 through impregnating gas supply pipe 32. Heat exchanger 33 and pressure control valve 34 are inserted in pipe 32 from the upstream side. Therefore, carbon dioxide gas supplied from gas tank 29 passes through heat exchanger 33, so that the temperature of the gas is decreased to a predetermined temperature. The resultant gas is then supplied to impregnation vessel 10. Pressure control valve 34 is actuated by the pressure in impregnation vessel 10 to maintain a constant pressure of carbon dioxide gas in vessel 10. Pressure control valve 34 generally maintains the pressure of carbon dioxide gas to be 10 kg/cm$^2$ to 50 kg/cm$^2$ (gauge pressure), and 30 kg/cm$^2$ in this embodiment. Heat exchanger 33 generally maintains the temperature of carbon dioxide gas in impregnation vessel 10 to be $-40°$ C. to $15°$ C., and to be a temperature which prevents freezing of moisture contained in carbon dioxide gas, e.g., $5°$ C. in this embodiment.

In order to cause heat exchanger 33 to cool carbon dioxide gas, heat exchanger 33 is connected to coolant tank 37 through coolant circulating pipes 35 and 36. Circulation pump 38, temperature control heater 39, a three-way valve 40 are inserted in pipe 35. Heater 39 controls a cooling temperature of carbon dioxide gas with high precision. Three-way valve 40 controls a flow of a coolant in pipes 35 and 36.

According to heat exchanger 33 described above, when carbon dioxide gas passes through heat exchanger 33, moisture contained in carbon dioxide gas is not frozen in heat exchanger 33. Therefore, clogging of impregnating gas supply pipe 32 by freezing of the moisture can be prevented.

When the tobacco material is impregnated with carbon dioxide gas at a pressure of 15 kg/cm$^2$ of impregnation vessel 10, the internal temperature of vessel 10 is preferably kept at $-10°$ C. or less. In this case, carbon dioxide gas supplied from gas tank 29 to impregnation vessel 10 through impregnating gas supply pipe 32 must also be cooled to a temperature of $-10°$ C. or less. The following two cooling methods are available.

According to the first cooling method, in order to prevent moisture dissolved in liquefied carbon dioxide in storage tank 22 and moisture evaporated and recovered from the tobacco material during conveyance from being frozen in heat exchanger 33 and hence prevent blocking of the gas flow, dehumidifier 41 is inserted on the upstream side of heat exchanger 33 to perfectly eliminate the moisture from the gas. The dry gas is then cooled by heat exchanger 33 to a predetermined temperature, and then cooled gas is supplied to impregnation vessel 10.

According to the second cooling method, dehumidifier 41 is not inserted on the upstream side of heat exchanger 33. An outlet temperature of heat exchanger 33 is set to be about 2° C., and the gas is cooled to prevent its freezing. However, this temperature is higher than the predetermined temperature in the impregnation vessel. Therefore, the gas is cooled by the following operation. The pressure of gas tank 29 is kept at 35 kg/cm$^2$ and the gas is supplied to the impregnation vessel through pressure control valve 34. In this case, the gas pressure is abruptly reduced from 35 kg/cm$^2$ to 15 kg/cm$^2$, so that the gas supplied to the impregnation vessel is cooled from about 2° C. to $-10°$ C. or less by heat-insulating expansion.

Impregnation vessel 10 and intermediate vessel 14 are connected through first rotary valve 42 constituting part of the booster mechanism, the structure of which will be described with reference to FIG. 2.

First rotary valve 42 has circular housing 43. Inlet port 44 is formed at the upper portion of housing 43 and is connected to delivery port 16 of intermediate vessel 14. Outlet port 45 is formed at the lower portion of housing 43 and is connected to reception port 13 of impregnation vessel 10. Liner 46 is formed on the inner surface of housing 43. Openings which respectively communicate with inlet and outlet ports 44 and 45 are formed in liner 46.

Five connecting holes 47a, 47b, 47c, 47d, and 47e are formed in liner 46 between inlet and outlet ports 44 and 45 at equal angular intervals sequentially in the clockwise direction. Similarly, five connecting holes 47f, 47g, 47h, 47i, and 47j are formed in liner 46 between outlet and inlet ports 45 and 44 at equal angular intervals in the same manner as in holes 47a to 47e. Communication holes 48a to 48j which respectively communicate with holes 47a to 47j are formed in housing 43. As can be apparent from FIG. 2, communication hole 48a is connected to communication hole 48i through first pressure equalizer 49. Communication hole 48b communicates with communication hole 48h through second pressure equalizer 50. Similarly, communication hole 48c is connected to communication hole 48g through third pressure equalizer 51, and communication hole 48d is connected to communication hole 48f through fourth pressure equalizer 52. Communication hole 48e is connected to impregnating gas supply pipe 32 through communication pipe 53. Communication pipe 53 is branched from a downstream portion of impregnating gas supply pipe 32 with respect to pressure control valve 34. Communication hole 48j is connected to supply portion 55 of intermediate vessel 14 through communication pipe 54 (FIG. 1).

Rotor 56 which can be slidably rotated along the inner surface of liner 46 is disposed in housing 43. Rotor 56 is mounted on output shaft 57 of a drive motor (not shown). Rotor 56 is rotated by this drive motor in the clockwise direction of an arrow in FIG. 2. Fourteen pockets 58 are formed on the circumferential surface at equal intervals. As is apparent from FIG. 2, each pocket 58 has a sector cross section expanding outward from rotor 56. Pockets 58 are sequentially connected to inlet and outlet ports 44 and 45 and connecting holes 47a to 47j, i.e., communication holes 48a to 48j upon rotation of rotor 56.

The pressure of carbon dioxide gas, i.e., impregnating gas in impregnation vessel 10 is kept at 30 kg/cm$^2$ (gauge pressure). Upon rotation of rotor 56, the impregnating gas is supplied from impregnation vessel 10 to pocket 58 communicating with outlet port 45. The pressure in pocket 58 communicating with outlet port 45 is the same as that of impregnation vessel 10. Pocket 58 connected to impregnation vessel 10 can be sequentially connected to connecting holes 47f to 47j, i.e., communication holes 48f to 48j upon rotation of rotor 51. In this case, since holes 48f, 48g, 48h, and 48i communicate with holes 48d, 48c, 48b, 48a through the pressure equalizers, respectively. The pressure of the impregnating gas in pocket 58 having communicated with outlet port 45 is reduced when this pocket 58 is sequentially connected to holes 48f to 48j. When pocket 58 is connected to communication hole 48j, the impregnating gas in pocket 58 is supplied to intermediate vessel 14 through pipe 54 and supply portion 55. Upon rotation of rotor 56, the impregnating gas is continuously supplied from impregnation vessel 10 to intermediate vessel 14. Therefore, when the expanding apparatus is started, the pressure of the impregnating gas in intermediate vessel 14 is gradually increased.

As shown in FIG. 1, supply portion 55 in intermediate vessel 14 is connected to recovery gas holder 24 through return pipe 59. Strainer 60 and pressure control valve 61 are sequentially inserted in pipe 59 from the side of intermediate vessel 14. Valve 61 is actuated by the pressure of the impregnating gas in intermediate vessel 14, i.e., the pressure of the impregnating gas (as a pilot pressure) in return pipe 59 between supply portion 55 and pressure control valve 61 in intermediate vessel 14. Pressure control valve 61 has a function for setting the pressure of the impregnating gas in intermediate vessel 14 to be a predetermined value, e.g., 15 kg/cm$^2$ (gauge pressure).

When the impregnating gas is supplied from impregnation vessel 10 to intermediate vessel 14 through communication pipe 54 and supply portion 55, the pressure of the impregnating gas in intermediate vessel 14 is gradually increased. The pressure of intermediate vessel 14 is controlled to be 15 kg/cm$^2$ (gauge pressure) by pressure control valve 61.

When the pressure of the impregnating gas in intermediate vessel 14 is kept at 15 kg/cm$^2$ (gauge pressure), the pressure of the impregnating gas in impregnation vessel 10 is applied to pockets 58 of rotor 56 which sequentially pass through outlet port 45 of first rotary valve 42. At the same time, the pressure of the impregnating gas in intermediate vessel 14 is applied to pockets 58 of rotor 56 which pass through inlet port 44. Each pocket 58 of rotor 56 which has passed inlet port 44 is sequentially connected to communication holes 48a to 48d upon rotation of rotor 56. As previously described, these holes 48a, 48b, 48c, and 48d communicate with holes 48i, 48h, 48g, and 48f, respectively. Each pocket 58 of rotor 56 which has passed inlet port 44 is sequentially connected to communication holes 48a to 48d and pockets 58 located on the left half of rotor 56 in FIG. 2 through pipes 49 to 52. The pressure of each pocket 58 located on the left half of rotor 56 is gradually increased from inlet port 44 to outlet port 45. The pressure of the impregnating gas in each pocket 58 which has passed inlet port 44 is increased stepwise. More specifically, when viewed in the clockwise direction of rotor 56, boosting stages from inlet port 44 to outlet port 45 are five stages, while deboosting stages from outlet port 45 to inlet port 44 are five stages. The pressures of two pockets 58 connected through the corresponding pressure equalizer are the same. Assuming that the volumes of pockets 58 are equal to each other and that the volumes of pipes 49, 50, 51 and 52 are also equal to each other, then in each of the boosting and deboosting stages, the pressures of the impregnating gases in pockets 58 are equally increased or decreased by every 1/5 of 15 kg/cm$^2$ as a pressure difference between inlet and outlet ports 44 and 45, that is, every 3 kg/cm$^2$. As a result, when rotor 56 is located at the angular position shown in FIG. 2, the pressures of the impregnating gas in pockets 58 are represented by numeric values written in pockets 58. In the state shown in FIG. 2, pocket 58 connected to communication hole 48e is always connected to impregnating gas supply pipe 32 through hole 48e and pipe 53. The pressure of the impregnating gas in pocket 58 is set to be 30 kg/cm$^2$. Pocket 58 connected to communication hole 48j is further connected to intermediate vessel 14, so that the pressure of the impregnating gas therein is 15 kg/cm$^2$.

Pocket purge path 62 located on the hole 48f side and extending toward rotor 56 is formed in outlet port 45 of first rotary valve 42. One end of path 62 is open toward the circumferential surface of rotor 56. The other end of path 62 is connected to impregnating gas supply pipe 32 through hole 63 formed in housing 43 and through high-pressure purge pipe 64. More specifically, pipe 64 is connected to a portion of pipe 32 between heat exchanger 33 and pressure control valve 34. Pressure reducing valve 65 is inserted midway along pipe 64. Valve 65 supplies the impregnating gas having a pressure higher than that in impregnation vessel 10 to pocket purge path 62.

Since first rotary valve 42 is disposed between intermediate vessel 14 and impregnation vessel 10, the tobacco material in intermediate vessel 14 is guided to delivery port 16. The tobacco material is then supplied from delivery port 16 to inlet port 44 of first rotary valve 42. Upon rotation of rotor 56, the tobacco material is supplied from inlet port 44 to each pocket 58 of rotor 56. Each pocket 58 supplied with the tobacco material is conveyed toward outlet port 45 upon rotation of rotor 56. When each pocket 58 reaches outlet port 45, the tobacco material therein is supplied to impregnation vessel 10 through outlet port 45 and reception port 13 of vessel 10. During movement of pockets 58 filled with the tobacco material from inlet port 44 of valve 42 to outlet port 45, the pressures of the impregnating gas in pockets 58 are increased stepwise, as described above. In addition, immediately before each pocket 58 is connected to outlet port 45, pocket 58 is connected to impregnating gas supply pipe 32 through communication hole 48e and communication pipe 53, and the pressure of pocket 58 is set to be equal to that in impregnation vessel 10. As a result, when pocket 58 filled with the tobacco material is connected to impregnation vessel 10, the pressure of pocket 58 is equal to that of vessel 10. The tobacco material in each pocket 58 can therefore be smoothly supplied to vessel 10 by the weight of tobacco material. More specifically, use of first rotary valve 42 prevents a substantial decrease in pressure of the impregnating gas in vessel 10 even if a pressure difference is present between vessels 10 and 14, so that the tobacco material can be smoothly transferred from vessel 14 to vessel 10.

In this embodiment, since pocket purge path 62 is formed in outlet port 45 of first rotary valve 42, the impregnation gas having a pressure slightly higher than that in outlet port 45 can be sprayed from one end of path 62 toward the circumferential surface of rotor 56, i.e., toward each pocket 58. Upon spraying, the tobacco material in each pocket 58 can be properly discharged toward outlet port 45.

After the tobacco material passes through outlet port 45, the pressures of empty pockets 58 are decreased stepwise, as previously described, during moving toward inlet port 44 upon rotation of rotor 56. Immediately before pocket 58 is connected to inlet port 44 again, its pressure is set to be equal to that of intermediate vessel 14. As a result, the tobacco material can be smoothly supplied from intermediate vessel 14 to each pocket of rotor 56 upon rotation of rotor 56.

Figure 3:
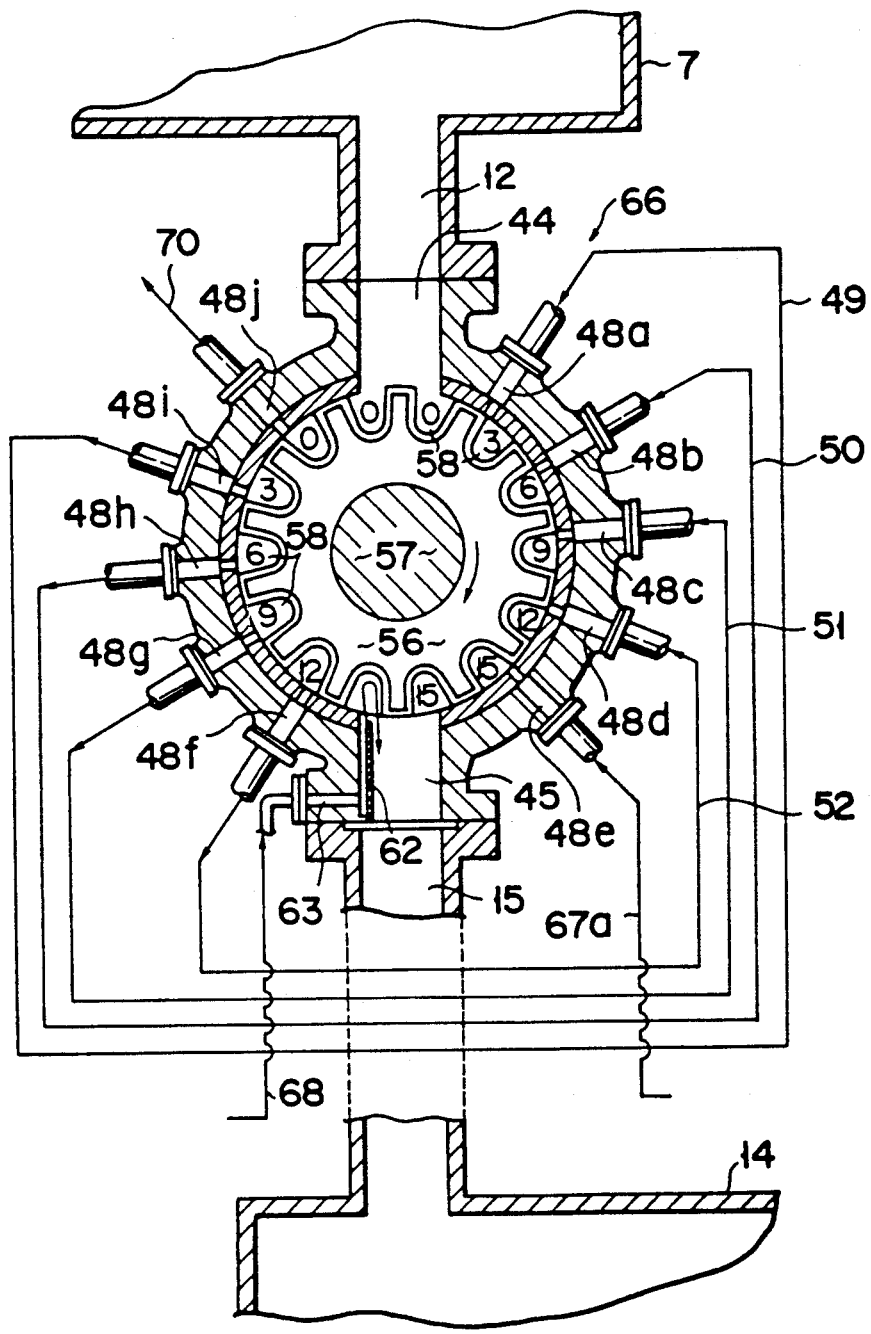

Second rotary valve 66, like first rotary valve 42, is disposed between intermediate vessel 14 and preparatory vessel 7. Valve 66 together with valve 42 constitutes part of the booster mechanism. Valve 66 is best illustrated in FIG. 3. As is apparent from FIG. 3, valve 66 has substantially the same structure as that of valve 42. The same reference numerals as in first rotary valve 42 denote the same parts and members in second rotary valve 66, and a detailed description thereof will be omitted. Only differences between valves 42 and 66 will be described below.

In second rotary valve 66, communication pipe 67a corresponding to communication pipe 53 of first rotary valve 42 is connected to return pipe 59 extending from intermediate vessel 14, as shown in FIG. 1. Medium-pressure purge pipe 68 corresponding to high-pressure purge pipe 64 of valve 42 is connected to impregnating gas supply pipe 32 in the same manner as in pipe 64. Pressure reducing valve 69 is inserted in pipe 68. Valve 69 supplies the impregnating gas having a pressure slightly higher than that in vessel 14 to pocket purge path 62 of second rotary valve 66.

In second rotary valve 66, communication pipe 70 corresponding to communication pipe 54 of first rotary valve 42 is connected to preparatory vessel 7 and recovery gas holder 24, as is apparent from FIG. 1. Opening-/closing valve 71 is inserted in pipe 70. When valve 71 is open, the impregnating gas is supplied from second rotary valve 66 to vessel 7 through pipe 70. In this case, the pressure of the impregnating gas supplied to vessel 7 is apparently higher than the atmospheric pressure. Therefore, the impregnating gas is filled in vessel 7. However, since vessel 7 communicates with the outer atmosphere, its internal pressure is substantially the same as the atmospheric pressure. A pressure difference between preparatory vessel 7 and intermediate vessel 14 is 15 kg/cm$^2$ (gauge pressure). Therefore, the pressures of pockets 58 are represented by values written in these pockets 58 in FIG. 3.

According to the second rotary valve 66, the tobacco material is supplied from preparatory vessel 7 to pockets upon rotation of rotor 56 and can be properly supplied from pockets 58 to intermediate vessel 14 in the same manner as in first rotary valve 42. In addition, according to valve 66, pressure loss of vessel 14 is also prevented.

As shown in FIG. 1, cooling jackets 72 and 73 are formed on the outer surfaces of impregnation vessel 10 and intermediate vessel 14, respectively. Jackets 72 and 73 are connected to coolant supply pipe 71 through corresponding branched supply pipes 74 and 75. Pipe 171 is connected to tank 37, and circulation pump 38a is arranged in pipe 171 near tank 37. Cooling jackets 72 and 73 are connected to return pipe 80 through corresponding branched return pipes 78 and 79. Return pipe 80 is connected to coolant tank 37. Since cooling jackets 72 and 73 are formed on vessels 10 and 14, respectively, a coolant is supplied from coolant tank 37 to cooling jackets 72 and 73 and the temperature of the impregnating gas in vessels 10 and 14 can be kept constant.

Figure 2:
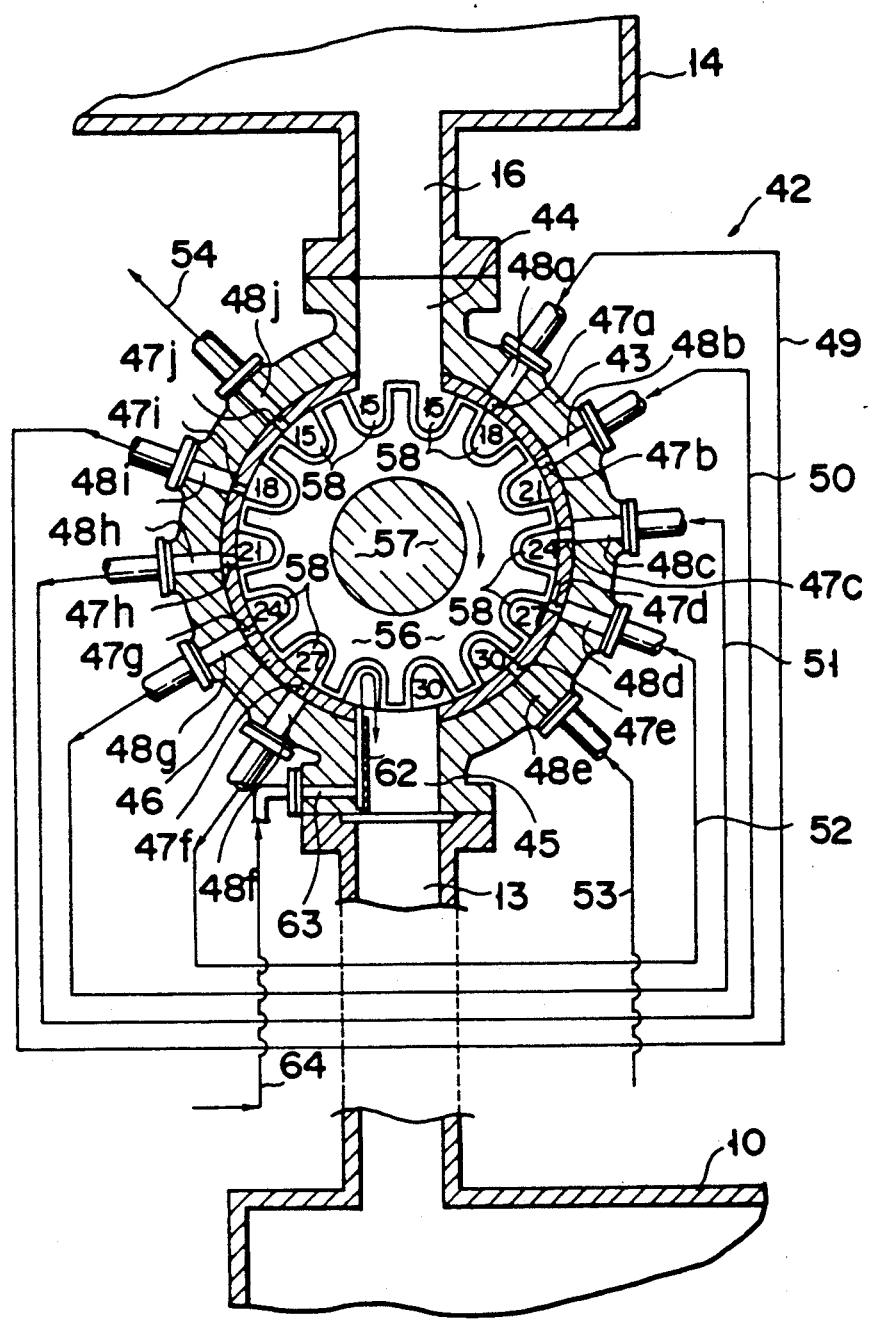

Although not shown in FIGS. 2 and 3 but as schematically shown in FIG. 1, cooling jackets 81 are mounted on first and second rotary valves 42 and 66 to cover them. These jackets 81 are connected to branched supply pipe 75, i.e., coolant supply pipe 171. At the same time, jackets 81 are connected to return path 80 through paths 82 and 83. Since jackets 81 are formed on valves 42 and 43, respectively, an increase in temperature upon driving of valves 42 and 66 can be prevented. Therefore, the temperature of the impregnating gas in impregnation vessel 10 and intermediate vessel 14 can be kept constant with high precision.

Delivery port 84 is formed at the other end of impregnation vessel 10. Endless blow pipe 85 is disposed below delivery port 84. Blow pipe 85 and delivery port 84 of impregnation vessel 10 are connected through delivery pipe 86. Large-diameter pipe portion 87 is disposed midway along delivery pipe 86. Pipe portion 87 has an inverted flask-like shape such that an upper portion has a large diameter and the diameter is reduced toward its lower portion. Pipe portion 87 is connected to return pipe 59 through pipe 88. Therefore, the pressure of pipe portion 87 is equal to that of intermediate vessel 14, i.e., 15 kg/cm$^2$ (gauge pressure).

A delivery mechanism, e.g., screw conveyor 89, for delivering the tobacco material from impregnation vessel 10 to blow pipe 85 through delivery pipe 86 is arranged in impregnation vessel 10. Screw conveyor 89 is the same as screw conveyors 17 and 18. Screw conveyor 89 is rotated by motor 90 with a reduction gear mechanism. When screw conveyor 89 is arranged inside impregnation vessel 10, the tobacco material therein can be conveyed toward delivery port 84 upon rotation of conveyor 89. The tobacco material is guided from delivery port 84 to blow pipe 85 through delivery pipe 86.

Third rotary valve 91 constituting part of a debooster mechanism is inserted between delivery port 84 of impregnation vessel 10 and large-diameter pipe portion 87 of delivery pipe 86. As is apparent from FIG. 4, valve 91 has the same structure as that of first and second rotary valve 42 and 66. Only differences between valve 91 and valve 42 or 66 will be described below.

In third rotary valve 91, communication hole 48a communicates with communication hole 48j through pressure equalizer 92. Communication hole 48b communicates with communication hole 48i through pressure equalizer 93. Communication hole 48c communicates with communication hole 48h through pressure equalizer 94, and communication hole 48d communicates with communication hole 48g through pressure equalizer 95. Communication hole 48e communicates with communication hole 48f through pressure equalizer 96. As is apparent from FIGS. 1 and 4, pressure equalizer 92 is connected to impregnating gas supply pipe 32 through pipe 97, and pressure equalizer 96 is connected to return pipe through pipe 98.

Pocket purge path 62 of third rotary valve 91 is connected to a downstream portion (with respect to pressure reducing valve 69) of medium-pressure purge pipe 68 through medium-pressure purge pipe 99. A connection between medium-pressure purge pipes 68 and 99 is not illustrated for illustrative convenience in FIG. 1.

Figure 4:
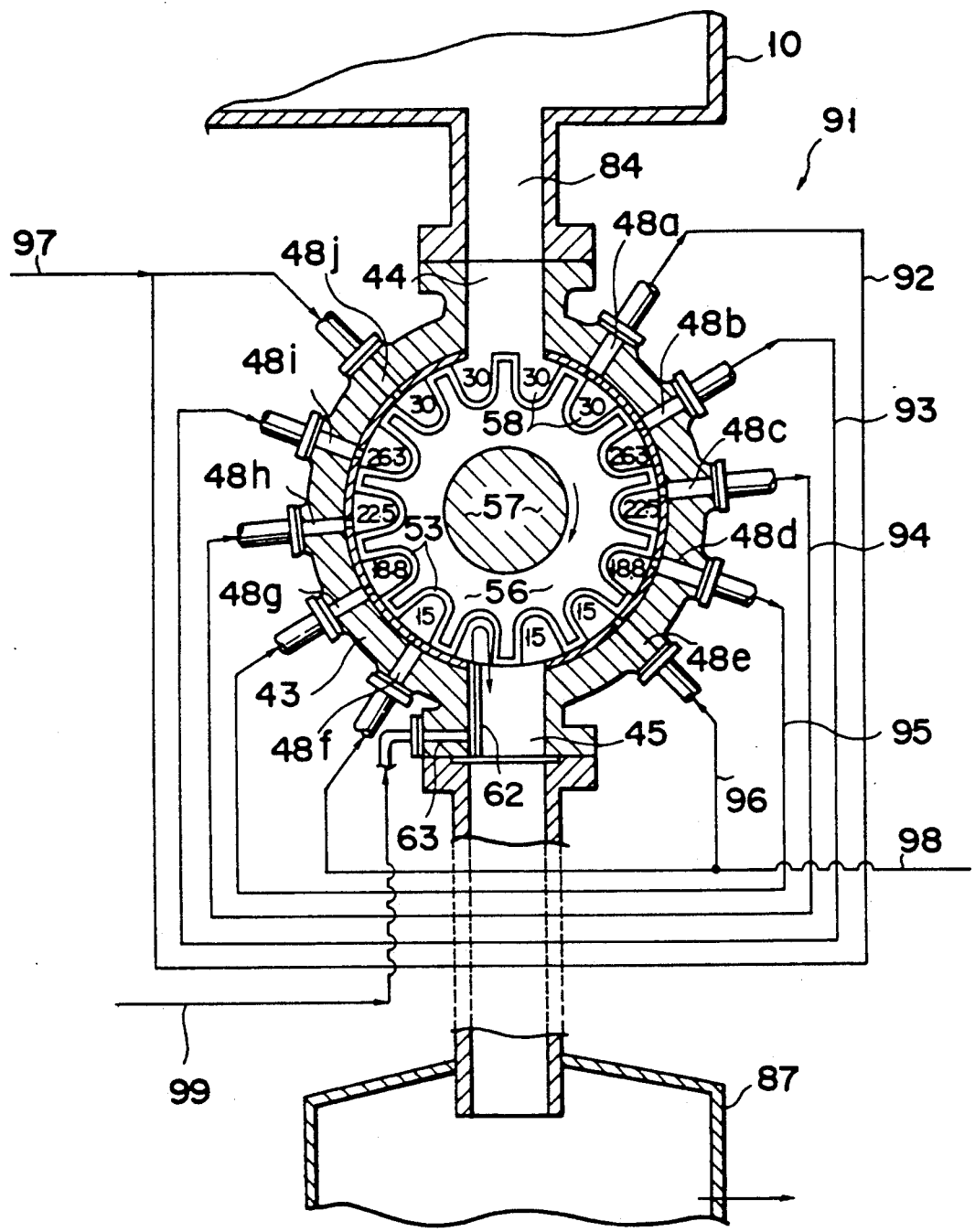
Figure 5:
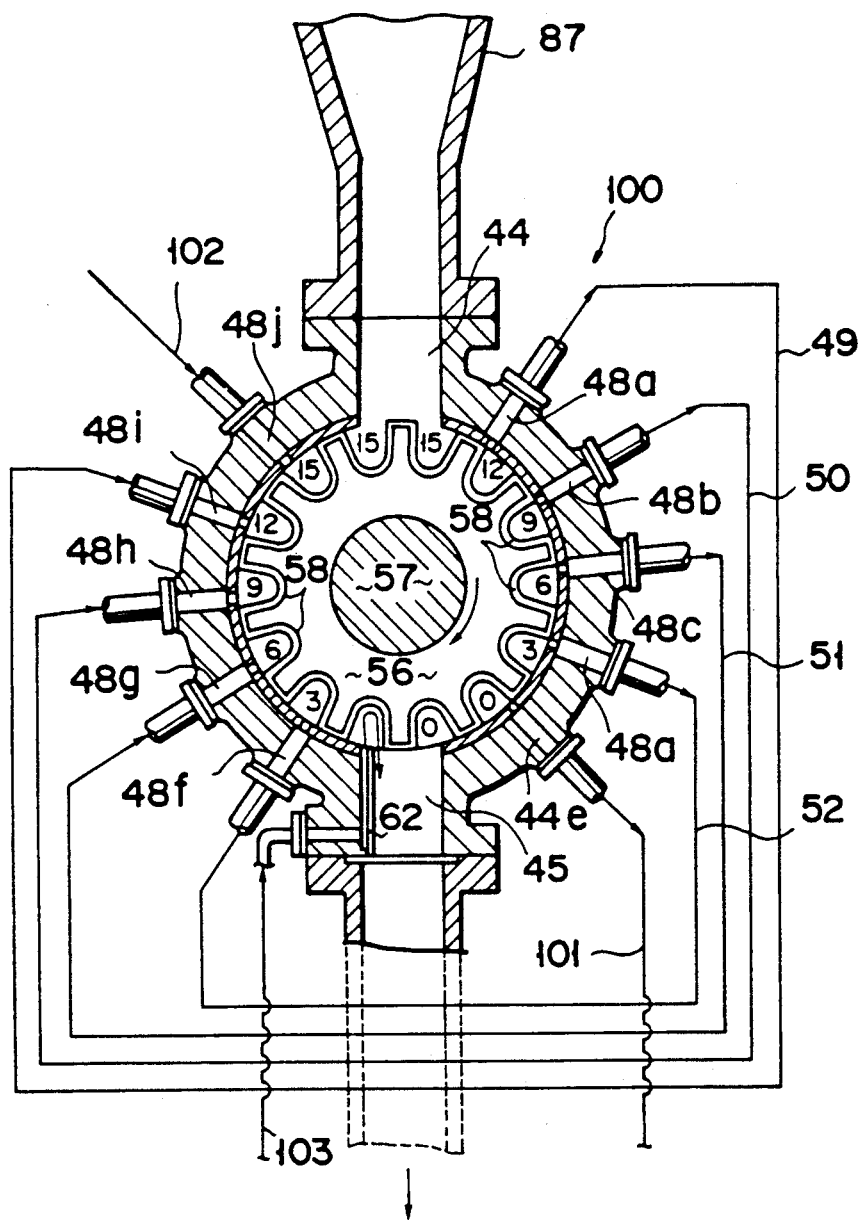

According to third rotary valve 91, the pressure of each pocket 58 during its movement from high-pressure inlet port 44 to low-pressure outlet port 45 upon rotation of rotor 56 is gradually reduced since it is sequentially connected to communication holes 48a to 48e. During movement of each pocket 58 from low-pressure outlet port 45 to high-pressure inlet port 44, it is sequentially connected to communication holes 48f to 48j and is gradually increased. As a result, a pressure distribution of pockets 58 in third rotary valve 91 is as illustrated in FIG. 4. In FIG. 4, the pressures are represented by values written in pockets 58.

Fourth rotary valve 100 (best illustrated in FIG. 5) is inserted between blow pipe 85 and large-diameter pipe portion 87 of delivery pipe 86. Fourth rotary valve 100 together with third rotary valve 91 constitutes part of the debooster mechanism. Valve 100 has substantially the same structure as each of the above-mentioned rotary valves. Layout of pressure equalizers is the same as in first and second rotary valve 42 and 66. That is, rotary valve 100 has pressure equalizers 49, 50, 51, and 52 which are the same as those in first and second rotary valves 42 and 66. In fourth rotary valve 100, communication pipe 101 corresponding to communication pipe 53 or 67 in first or second rotary valve 42 or 66 is connected to recovery gas holder 24 through communication pipe 70 of second rotary valve 66, as shown in FIG. 1. Communication pipe 102 of fourth rotary valve 100 which corresponds to communication pipe 54 or 70 of rotary valve 42 or 66 is connected to return pipe 59. In fourth rotary valve 100, low-pressure purge pipe 103 connected to pocket purge path 62 is connected to medium-pressure purge pipe 99 of third rotary valve 91 through a pressure reducing valve (not shown). This pressure reducing valve supplies the impregnating gas having a pressure slightly higher than the atmospheric pressure to pocket purge path 62 of fourth rotary valve 100.

In the above description, in third and fourth rotary valves 91 and 100, the impregnating gas having a predetermined pressure is supplied to pocket purge path 62 in the same manner as in first and second rotary valves 42 and 66. However, if the tobacco material can be smoothly discharged from third and fourth rotary valves 91 and 100 without spraying the impregnating gas from pocket purge path 62 can be stopped. In this case, holes 63 of third and fourth rotary valves 91 and 100 are closed.

As shown in FIG. 1, cooling jackets 80 are formed on the outer surfaces of third and fourth rotary valves 91 and 100 and large-diameter pipe portion 87 in the same manner as in first and second rotary valves 42 and 66, as shown in FIG. 1. Jackets 80 on third rotary valve 91 and large-diameter pipe portion 87 are connected to branched supply pipe 74 and to branched return pipe 78 through a pipe. Jacket 80 on fourth rotary valve 100 is connected to coolant supply pipe 71 and return pipe 80 through pipes, as shown in FIG. 1.

Air locker 103 is inserted between fourth rotary valve 100 and blow pipe 85, as needed. Air locker 103 is simply connected to fourth rotary valve 100 and blow pipe 85 to transfer the tobacco material from valve 100 to blow pipe 85 and prevents the heat transfer between fourth rotary valve 100 and blow pipe 85.

If the pressure of blow pipe 85 is equal to the atmospheric pressure, the interior of outlet port 45 of fourth rotary valve 100 communicates with the outer atmosphere through air locker 103.

In this state, when fourth rotary valve 100 is driven, the pressures of pockets 58 which receive the pressure from large-diameter pipe portion 87 through inlet port 44 upon rotation of rotor 56 are reduced in five stages during moving of pockets from inlet port 44 to outlet port 45. The pressures of pockets 58 which receive the pressure from blow pipe 85 through outlet port 45 are reduced in five stages during moving of pockets from outlet port 45 to inlet port 44. The pressure distribution of pockets 58 is given by pressure values written in pockets 58 in FIG. 5.

Since third and fourth rotary valves 91 and 100 are arranged in delivery pipe 86, the tobacco material delivered from delivery port 84 of impregnation vessel 10 is fed from delivery port 84 to outlet port 45 through pockets 58 of third rotary valve 91. The tobacco material is then conveyed from outlet port 45 to large-diameter pipe portion 87. The tobacco material is fed from pipe portion 87 to outlet port 45 of fourth rotary valve 100 through pockets 58 of fourth rotary valve 100. Finally, the tobacco material is guided from outlet port 45 to blow pipe 85 through air locker 103. In third and fourth rotary valves 91 and 100, unlike in first and second rotary valves 42 and 66, the pressures in pockets 58 which receive and convey the tobacco material are reduced stepwise, as can be apparent from the above description. The tobacco material can be smoothly delivered from impregnation vessel 10 to blow pipe 85. In addition, the pressure loss in impregnation vessel 10 during delivery of the tobacco material, i.e., the pressure loss of the impregnating gas can be prevented.

Blower 104 is inserted in blow pipe 85. Blower 104 generates a flow of a heating medium in a direction of an arrow (FIG. 1) in blow pipe 85. In blow pipe 85, flow control valve 105 and heater 106 serving as a heating mechanism are sequentially inserted between blower 104 and air locker 103. Exhaust pipe 107 is branched from a portion of blow pipe 85 between blower 104 and flow control valve 105. Normally closed exhaust valve 108 is inserted in exhaust pipe 107. Steam supply pipe 109 and air supply pipe 110 extend from portions of blow pipe 85 between flow control valve 105 and heater 106 sequentially in an air flow direction. Pipes 109 and 110 are connected to steam source 112 and air source 113 through flow control valves 111, respectively.

The operation of heater 106 is controlled on the basis of a temperature near a connecting portion between blow pipe 85 and outlet port 45 of air locker 103. In this embodiment, heater 106 is operated to heat the heating medium flowing toward the connecting portion, i.e., outlet port 45 of air locker 103 to be 100° C. to 350° C., and more preferably 180° C. to 220° C.

A separator, e.g., tangential separator 114 is inserted in a downstream portion of blow pipe 85 with respect to air locker 103. Air locker 115 having the same structure as that of air locker 103 is disposed at the outlet of separator 114. Rotary drum type humidifier 116 having the same structure as that of humidifier 1 is arranged below air locker 115. A charging port of humidifier 116 is located immediately below air locker 115 and receives the tobacco material discharged from air locker 115. The tobacco material is then charged in humidifier 116. Humidifying nozzle 117 is arranged in humidifier 116 in the same manner as in humidifier 11. Nozzle 117 is connected to a water/steam source (not shown). Conveyor 118 extends from the discharge port of humidifier 116 and is connected to a device of the subsequent stage (not shown).

In the expanding apparatus according to the first embodiment described above, the tobacco material dampened in humidifier 1 is continuously supplied to impregnation vessel 10 through preparatory vessel 7, second rotary valve 66, intermediate vessel 14, and first rotary valve 42. Since impregnation vessel 10 is filled with the high-pressure impregnating gas of carbon dioxide, during feeding of the tobacco material by screw conveyor 89 to delivery port 84 of vessel 10, the tobacco material is impregnated with the impregnating gas, i.e., carbon dioxide gas.

The tobacco material impregnated with the impregnating gas in impregnation vessel 10 is continuously discharged from delivery port 84 of vessel 10 to blow pipe 85 through third rotary valve 91, large-diameter pipe portion 87, fourth rotary valve 100, and air locker 103.

The heating medium as a mixture of air supplied from blower 104 and steam flows in blow pipe 85, so that the tobacco material impregnated with carbon dioxide gas and supplied to blow pipe 85 is blown toward separator 114. During blowing, since the heating medium is heated to a predetermined temperature by heater 99, the impregnated tobacco material is abruptly heated by heat from the heating medium. Carbon dioxide impregnated in the tobacco material is evaporated from the tobacco material. That is, a large amount of impregnating gas, e.g., carbon dioxide gas is discharged from the tobacco material. Evaporation of carbon dioxide gas causes expansion of the tobacco material. The expanded tobacco material is fed with air and reaches separator 114. The tobacco material is separated from the heating medium by separator 114 and is charged in humidifier 116 through air locker 115. The tobacco material whose water content is reduced to 2% to 6% by expansion is finally dampened to have a water content of 12% in humidifier 116. Thereafter, the tobacco material is transferred from the outlet of humidifier 116 to conveyor 118 and is fed to the next device along conveyor 118.

Since the expanding apparatus according to the present invention uses carbon dioxide gas, the pressure of the impregnating gas in impregnation vessel 10 is preferably set to, e.g., 30 kg/cm$^2$ (gauge pressure) as in the first embodiment in order to effectively impregnate the tobacco material with carbon dioxide. In order to continuously perform impregnation in impregnation vessel 10, the tobacco material must be continuously supplied to vessel 10 and the impregnated tobacco material must be continuously discharged from vessel 10. In order to satisfy the above needs, according to the first embodiment, first and second rotary valves 42 and 66 are arranged between preparatory vessel 7 and impregnation vessel 10, and third and fourth rotary valves 91 and 100 are arranged between vessel 10 and blow pipe 85. Therefore, the tobacco material can be continuously supplied to vessel 10 and continuously discharged therefrom while vessel 10 is kept at a high pressure. In the first embodiment, two rotary valves are arranged between preparatory vessel 7 and impregnation vessel 10 and similarly two rotary valves are arranged between vessel 10 and pipe 85 to reduce a pressure difference between inlet and outlet ports 44 and 45 of each rotary valve. As a result, a pressure load acting on each rotary valve can be reduced.

According to the first embodiment, since intermediate vessel 14 is arranged between preparatory vessel 7 and impregnation vessel 10, i.e., between first and second rotary valves 42 and 66, pressure variations in impregnating gas between first and second rotary valves 42 and 66 upon operation of first and second rotary valves 42 and 66 can be absorbed by the volume of intermediate vessel 14. Therefore, the pressure variations in impregnating gas to be transmitted within vessel 10 can be minimized. In addition, screw conveyor 18 is arranged in intermediate vessel 14 to discharge the tobacco material therefrom. Screw conveyor 18 discharges the tobacco material and effectively minimizes the pressure variations in intermediate vessel 14. In other words, as screw conveyor 18 is arranged inside intermediate vessel 14, transmission of pressure variations in vessel 14 can be prevented by screw conveyor 18. As a result, the pressure variations transmitted to impregnation vessel 10 can be effectively prevented.

The impregnation treatment performed in impregnation vessel 10 causes generation of absorption heat and adsorption heat. In practice, the tobacco material in intermediate vessel 14 is slightly impregnated with carbon dioxide gas. Therefore, the tobacco material in vessel 14 also generates absorption heat and adsorption heat. For this reason, the expanding apparatus of the first embodiment includes cooling jackets 80 for impregnation vessel 10, intermediate vessel 14, and first to fourth rotary valves, an undesirable increase in temperature of the impregnating gas can be prevented by the coolant supplied to the cooling jackets 80. Impregnation of the tobacco material with the impregnation gas can be effectively performed while the temperature of the vessel is kept constant.

Regarding cooling of the tobacco material in intermediate vessel 14, as is apparent from first rotary valve 42 (FIG. 2) arranged between intermediate vessel 14 and impregnation vessel 10, when each pocket 58 of first rotary valve 42 is disconnected from communication hole 48and connected to communication hole 48j, the impregnating gas having a gauge pressure of 18 kg/cm$^2$ is supplied to vessel 14 through communication hole 48j and communication pipe 54. Since the pressure of the impregnating gas in vessel 14 is kept at a gauge pressure of 15 kg/cm$^2$, a pressure difference between the impregnating gas supplied from first rotary valve 42 to intermediate vessel 14 and the pressure in vessel 14 is 3 kg/cm² (gauge pressure). The impregnating gas supplied from first rotary valve 42 to intermediate vessel 14 is subjected to heat-insulating expansion due to the pressure difference, thus effectively cooling the interior of intermediate vessel 14. If cooling in vessel 14 is satisfactory by a cooling behavior based on heat-insulating expansion of the impregnating gas, cooling jacket 73 of vessel 14 may be omitted.

Figure 6A:
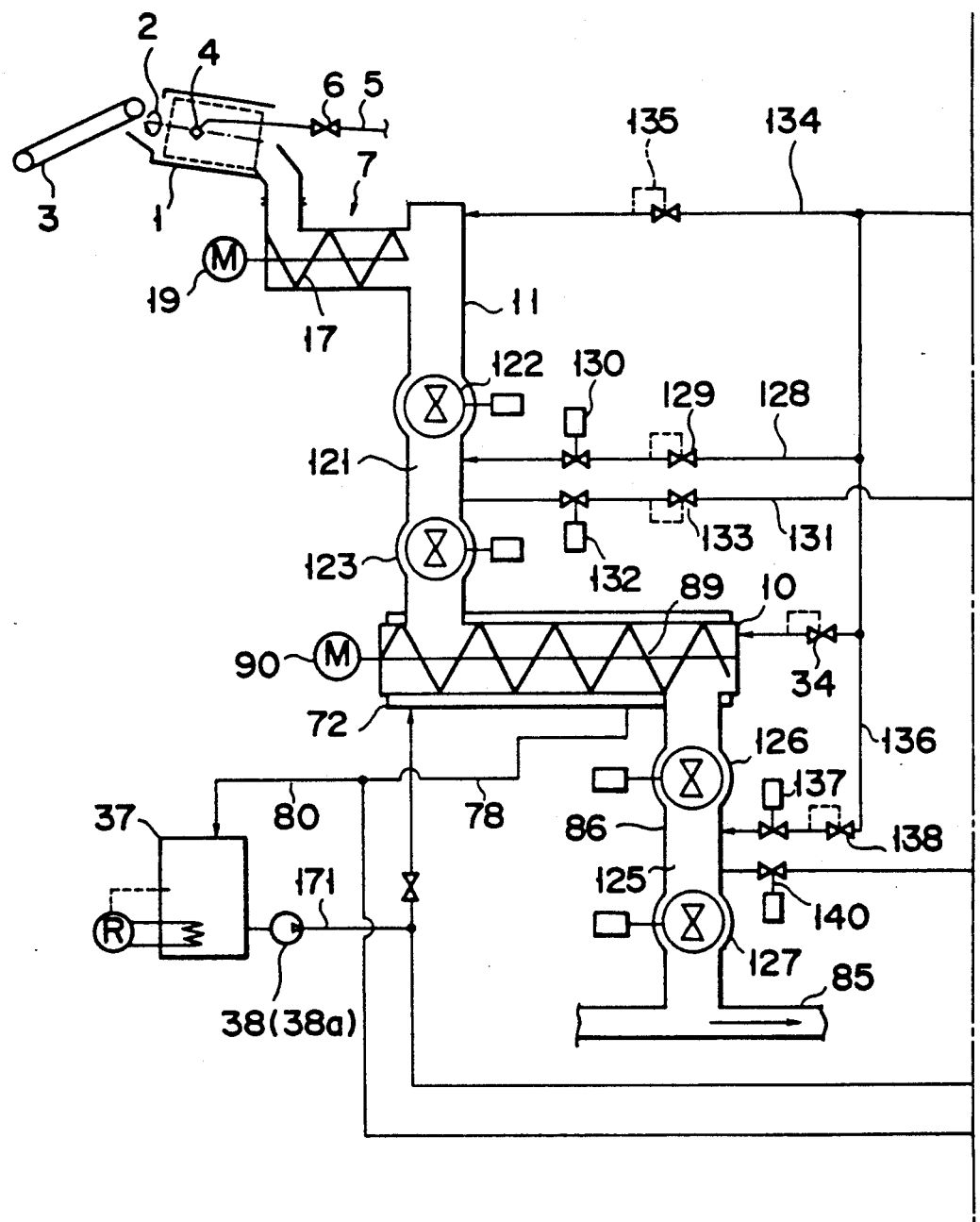
FIGS. 6A and 6B are schematic views showing halves of an expanding apparatus according to a second embodiment of the present invention.
Figure 6B:
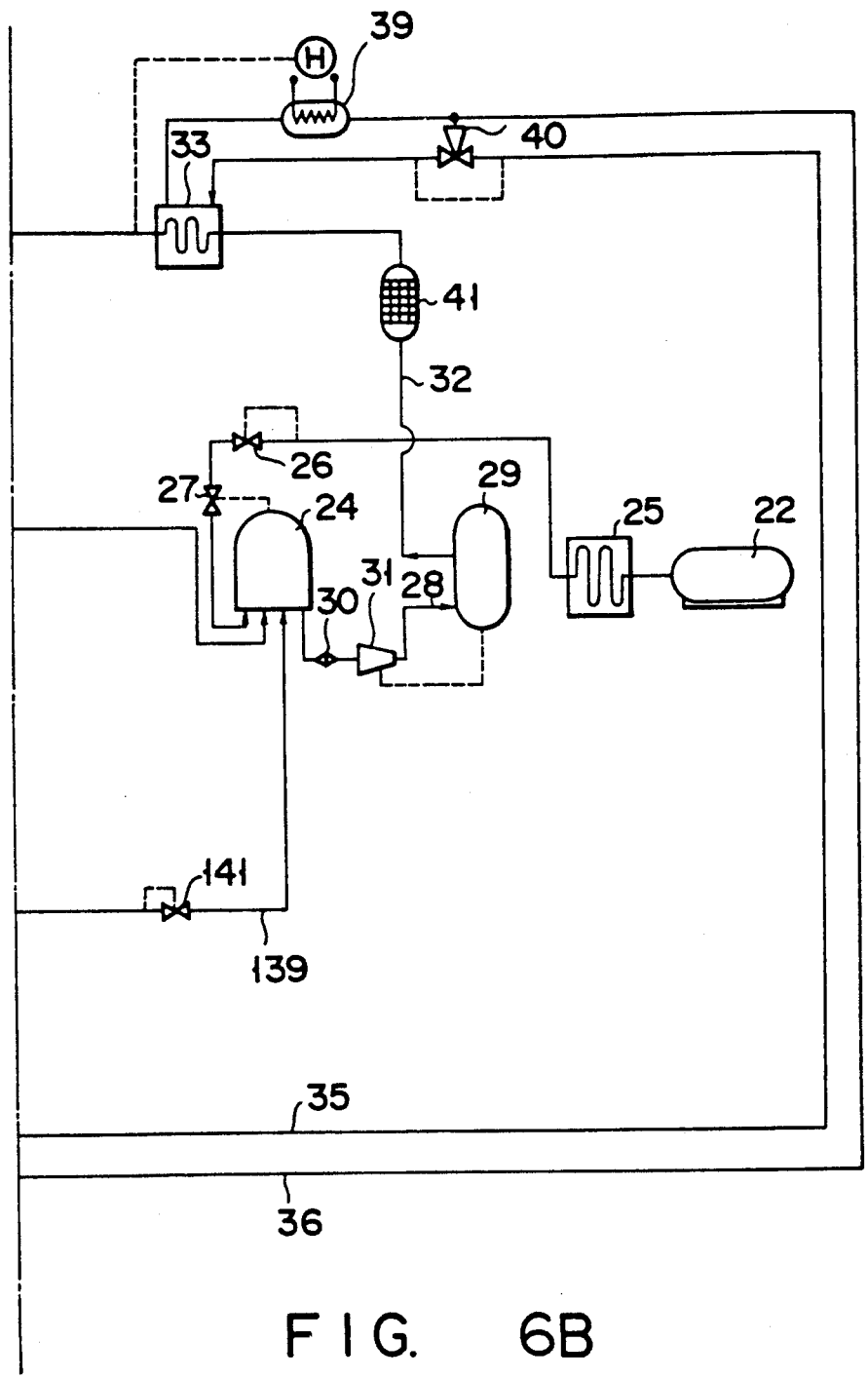

At expanding apparatus according to a second embodiment of the present invention will be described with reference to FIG. 6. The same reference numerals as in the expanding apparatus of the first embodiment denote the same parts and functions in the expanding apparatus of FIG. 6, and a detailed description thereof will be omitted.

In the expanding apparatus of the second embodiment, a portion between preparatory vessel 7 and impregnation vessel 10 is constituted by a cylindrical pipe member or vertical convey pipe 11.

Remote-controlled first ball valve 122 is inserted in convey pipe 11 on the preparatory vessel 7 side to open/close convey pipe 11. Remote-controlled second ball valve 123 is inserted in convey pipe 11 on the impregnation vessel 10 side to open/close convey pipe 11. Therefore, a portion of convey pipe 11 is defined between the first and second ball valves 122 and 123 and functions as a first pressure equalizer chamber 121. When first and second ball valves 122 and 123 are closed, equalizer chamber 121 is fluid-isolated from the preparatory and impregnation vessels 7 and 10.

In the second embodiment, delivery pipe 86 for connecting impregnation vessel 10 and blow pipe 85 is constituted by a vertical pipe member. Third ball valve 126 is inserted in delivery pipe 86 on the impregnation vessel 10 side to open/close delivery pipe 86. Fourth ball valve 127 is inserted in delivery pipe 86 on the blow pipe 85 side to open/close delivery pipe 86. A portion of delivery pipe 86 between third and fourth ball valves 126 and 127 is therefore defined as a second pressure equalizer chamber 125. When third and fourth ball valves 126 and 127 are closed, second pressure equalizer chamber 125 is isolated from vessel 10 and pipe 85.

In the second embodiment unlike in the first embodiment, high-pressure tank 29 stores an impregnating gas or carbon dioxide gas having a gauge pressure of 16 kg/cm² or more. The impregnating gas is supplied from tank 24 to impregnating vessel 10 through heat exchanger 33 and pressure control valve 34. Pressure control valve 34 supplies the impregnating gas having a gauge pressure of 15 kg/cm² to impregnation vessel 10.

High-pressure tank 29 is connected to first pressure equalizer 121 through first pressure supply pipe 128 branched from a downstream portion of impregnating gas supply pipe 32 with respect to heat exchanger 33. Pressure control valve 129 and solenoid valve 130 are sequentially inserted in first pressure supply pipe 128 from the heat exchanger 33 side. Valve 129 sets the pressure of the impregnating gas supplied to first pressure equalizer 121 through first pressure supply pipe 128 at a pressure substantially equal to that of impregnation vessel 10 and preferably a pressure slightly higher than that of vessel 10, e.g., in the range of 15.5 kg/cm² to 16 kg/cm². First exhaust pipe 131 extends from first pressure equalizer 121. Pipe 131 is connected to recovery gas holder 24. Solenoid valve 132 and, if necessary, pressure control valve 133 are sequentially inserted in pipe 131 from the first pressure equalizer chamber 121 side. In the second embodiment, purge gas supply pipe 134 extends from a downstream portion with respect to heat exchanger 33. Pipe 134 is connected to preparatory vessel 7. Pressure control valve 135 is inserted in purge gas supply pipe 134. Valve 135 supplies the impregnating gas having a pressure slightly higher than that of atmosphere, thereby filling vessel 7 with the impregnating gas.

Second pressure supply pipe 136 extends from second pressure equalizer 125. Pipe 136 is connected to a downstream portion of pipe 32 with respect to heat exchanger 33. Solenoid valve 137 and pressure control valve 138 are sequentially inserted in second pressure supply pipe 136 from the second pressure equalizer 125 side. Valve 138 sets the pressure of the impregnating gas supplied to second pressure equalizer 125 through second pressure supply pipe 136 at a pressure substantially equal to the pressure of the gas in impregnation vessel 10 and preferably a pressure slightly lower than that in vessel 10, e.g., in the gauge pressure range of 14 kg/cm² to 14.5 kg/cm². Second pressure equalizer 125 is connected to recovery gas holder 24 through second exhaust pipe 139. Solenoid valve 140 and, if necessary, pressure control valve 141 are inserted in exhaust pipe 139 from the second pressure equalizer 125 side.

An operation of the expanding apparatus according to the second embodiment of the present invention will be described below.

The tobacco material supplied to preparatory vessel 7 through humidifier 1 is fed to the upper portion of convey pipe 11 by screw conveyor 17. The upper portion of convey pipe 11 and preparatory vessel 7 are filled with the impregnating gas supplied through purge gas supply pipe 134.

Thereafter, first ball valve 122 is opened to cause the upper portion of convey pipe 11 to communicate with first pressure equalizer 121. Assume that first pressure equalizer 121 is filled with the impregnating gas having a pressure substantially equal to the atmospheric pressure. When first ball valve 122 is open, screw conveyor 17 in preparatory vessel 7 is simultaneously driven. The tobacco material in the upper portion of convey pipe 11 is pushed out by the tobacco material stored in preparatory vessel 7 and is supplied to first pressure equalizer 121. First ball valve 122 is then closed to separate first pressure equalizer 121 from the preparatory vessel 7 side.

Thereafter, solenoid valve 130 is energized to supply the impregnating gas to first pressure equalizer 121 through first pressure supply pipe 128 and pressure control valve 129. The pressure of the impregnating gas in first pressure equalizer 121 becomes slightly higher than that of impregnation vessel 10. At this time, solenoid valve 130 is closed. While the impregnating gas is being supplied to first pressure equalizer 121, a new tobacco material is supplied from preparatory vessel 7 to the upper portion of convey pipe 11.

Second ball valve 123 is then opened to tobacco material from second pressure equalizer 121 to impregnation vessel 10. Since the pressure of first pressure equalizer 121 is slightly higher than that of vessel 10, the tobacco material in second pressure equalizer 121 is smoothly supplied to vessel 10 due to a pressure difference between second pressure equalizer 121 and impregnation vessel 10 upon opening of second ball valve 123.

The tobacco material supplied in impregnation vessel 10 is impregnated during movement along screw conveyor 89 inside vessel 10. After the tobacco material is supplied from first pressure equalizer 121 to impregnation vessel 10, second ball valve 123 is closed and solenoid valve 132 is opened, thereby returning the impregnating gas from first pressure equalizer 121 to recovery gas holder 24 and hence reducing the pressure of first pressure equalizer 121 to the atmospheric pressure. Thereafter, solenoid valve 132 is closed. Therefore, a preparatory operation of receiving a new tobacco material to first pressure equalizer 121 is completed.

During desired impregnation in impregnation vessel 10, solenoid valve 137 is opened to supply the impregnating gas to second pressure equalizer 125 through second pressure supply pipe 136 and pressure control valve 138. When the pressure of the impregnating gas in second pressure equalizer 125 becomes lower than that in impregnation vessel 10, solenoid valve 137 is closed. Therefore, a preparation for receiving the impregnated tobacco material from impregnation vessel 10 to second pressure equalizer 125 is completed.

When third ball valve 126 is opened, the impregnated tobacco material is supplied from impregnation vessel 10 to second pressure equalizer 125. In this case, a pressure difference between impregnation vessel 10 and second pressure equalizer 125 is present, so that transfer of the impregnated tobacco material from vessel 10 to pressure equalizer 125 can be smoothly performed.

When the impregnated tobacco material is supplied to second pressure equalizer 125, third ball valve 126 is closed and second pressure equalizer 125 is separated from vessel 10.

Solenoid valve 140 is opened to return the impregnating gas from second pressure equalizer 125 to recovery gas holder 24. The pressure in second pressure equalizer 125 is decreased to about the atmospheric pressure and then solenoid valve 140 is closed.

When the pressure of second pressure equalizer 125 is reduced to the atmospheric pressure, fourth ball valve 127 is opened to discharge the impregnated tobacco material from second pressure equalizer 125 to blow pipe 85. During blowing of the tobacco material through blow pipe 85, the impregnated tobacco material is expanded in the same manner as in the first embodiment. The pressure near the outlet of fourth ball valve 127 during discharge of the impregnated tobacco material from second pressure equalizer 125 to blow pipe 85 is set to be a negative pressure a compared with the pressure in blow pipe 85 due to the flow of the heating medium in blow pipe 85. Therefore, the impregnated tobacco material can be smoothly supplied from equalizer 125 to pipe 85. When all the impregnated tobacco material is discharged from equalizer 125, fourth ball valve 127 is closed.

As is apparent from the above description, in the same manner as in the first embodiment, continuous impregnation of the tobacco material can be achieved in the second embodiment. In addition, in the second embodiment unlike in the first embodiment, the rotary valves need not be used, thus simplifying the structure and allowing easy maintenance.

Figure 7B:
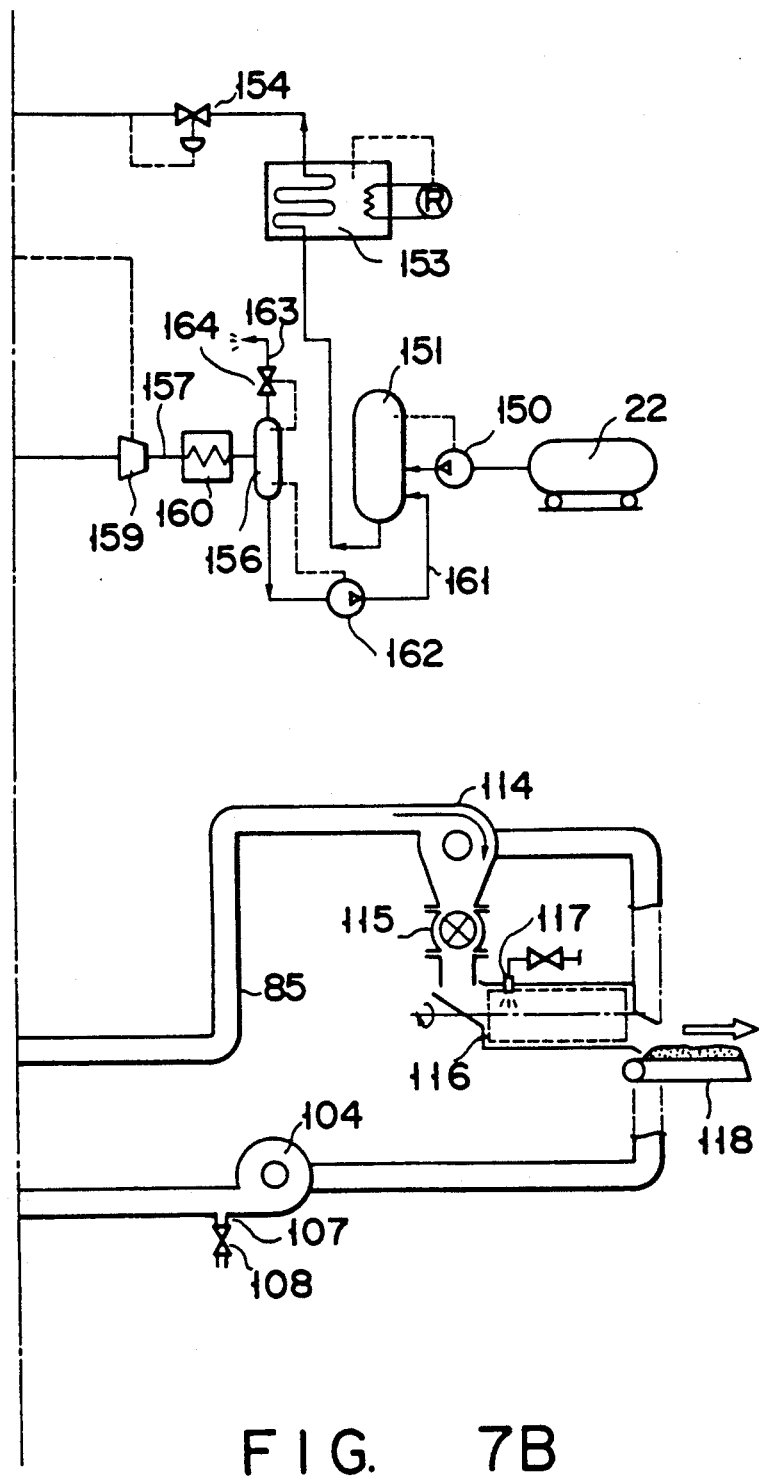

An expanding apparatus according to a third embodiment of the present invention is shown in FIG. 7. The expansion apparatus of the third embodiment uses liquefied carbon dioxide in place of carbon dioxide gas as an impregnating agent, unlike in the first and second embodiments. The same reference numerals as in the first and second embodiment denote the same parts and members in the third embodiment, and a detailed description thereof will be omitted.

In the third embodiment, liquefied carbon dioxide tank 22 is connected to supply tank 151 through supply pump 150. Pump 150 is actuated in accordance with a surface level of liquefied carbon dioxide stored in supply tank 151. Therefore, tank 151 always stores a predetermined amount of liquefied carbon dioxide having a high pressure.

Supply tank 151 is connected to impregnation vessel 10 through impregnating gas supply pipe 152. Cooler 153, pressure reducing valve 154, and flow control valve 155 are sequentially inserted in pipe 152 from the supply tank 151 side. Valve 155 controls a flow rate of liquefied carbon dioxide supplied to vessel 10, thereby maintaining the surface level of liquefied carbon dioxide in vessel 10 at a predetermined level. As is apparent from FIG. 7, vessel 10 is obliquely disposed such that the other end thereof is located in the upper position.

Pressure reducing valve 154 reduces the pressure of liquefied carbon dioxide to be supplied into impregnation vessel 10, i.e., the pressure of the impregnating agent into, e.g., a gauge pressure of 10 kg/cm$^2$ to 50 kg/cm$^2$. In the third embodiment, the pressure is reduced to 30 kg/cm$^2$ in the same manner as in the first embodiment. Cooler 153 cools the impregnating liquid to a temperature which inhibits evaporation of the liquid even if the pressure of the impregnating liquid is reduced.

Carbon dioxide gas, i.e., the impregnating gas having a gauge pressure of 30 kg/cm$^2$ is supplied from impregnation vessel 10 to intermediate vessel 14 through first rotary valve 42 and communication pipe 54 in the same manner as in the first embodiment. The impregnating gas is then supplied to preparatory vessel 7 through second rotary valve 66 and communication pipe 70. Therefore, preparatory vessel 7 is filled with the impregnating gas. The pressure of the impregnating gas in intermediate vessel 14 is set to be a gauge pressure of 15 kg/cm$^2$ by pressure control valve 61 inserted in return pipe 59.

Recovery gas holder 24 is connected to liquid receiver 156 through condensing pipe 157. Strainer 158, compressor 159, and condenser 160 are sequentially inserted in condensing pipe 157 from the recovery gas holder 24 side. Condenser 160 cools and liquefies carbon dioxide gas supplied from recovery gas holder 24. Liquid receiver 156 stores liquefied carbon dioxide cooled to almost the same temperature as that in supply tank 151. Liquid receiver 156 is connected to supply tank 151 through pipe 161. Circulation pump 162 is inserted in pipe 161. Atmospheric release pipe 163 is connected to liquid receiver 156. Air purge valve 164 is inserted in atmospheric release pipe 163. Valve 164 is opened when an air concentration in liquid receiver 156 exceeds a predetermined level, thereby exhausting air from liquid receiver 156.

Impregnating gas pipe 163 extends from recover gas holder 24. Strainer 164, compressor 165, and gas tank 166 are sequentially inserted in impregnating gas pipe 163 from the recovery gas holder 24 side. High-pressure purge pipe 64 with pressure reducing valve 65 and medium-pressure purge pipe 68 with pressure reducing valve 69 are branched from downstream portions of pipe 163 with respect to gas tank 166. Compressor 165 causes gas tank 166 to store the impregnating gas having a gauge pressure of 30 kg/cm$^2$.

In the third embodiment, large-diameter pipe portion 87 of delivery pipe 86 of the first embodiment is replaced with evaporating unit 167. Evaporating unit 167 has basically the same structure as that of impregnation vessel 10. However, unlike vessel 10, unit 167 is horizontally disposed. Evaporating unit 167 is cooled to the same temperature as that of vessel 10. The impregnated tobacco material discharged from vessel 10 is supplied to evaporating unit 167 through third rotary valve 91. Excessive liquefied carbon dioxide as the impregnating liquid attached to the tobacco material impregnated therewith is evaporated. The impregnating gas generated in this manner returns to recovery gas holder 24 through pipe 88, return pipe 59, and pressure control valve 61. The impregnated tobacco material in evaporating unit 167 is discharged through fourth rotary valve 100 by screw conveyor 169 driven by motor 168. The evaporation process of the excessive impregnating liquid in evaporating unit 167 can be controlled by varying the evaporation time of the impregnated tobacco material in unit 167.

Referring to FIG. 7, circulation piping between each cooling jacket 80 and coolant tank 37 is not illustrated for illustrative convenience.

According to the expanding apparatus of the third embodiment, unlike in the first and second embodiments, liquefied carbon dioxide can be used in impregnation of the tobacco material in impregnation vessel 10. In addition, even if liquefied carbon dioxide is used, impregnation and expansion of the tobacco material can be continuously performed.

When the impregnated tobacco material is delivered from impregnation vessel 10 to blow pipe 85 through delivery pipe 86, a pressure acting on the impregnated tobacco material is reduced stepwise when the tobacco material sequentially passes through third rotary valve 91, evaporating unit 167, and fourth rotary valve 100. Therefore excessive liquefied carbon dioxide attached to the tobacco material can be sufficiently evaporated, and liquefied carbon oxide attached to the tobacco material is not converted into dry ice. As a result, the impregnated tobacco material can be smoothly guided from impregnation vessel 10 to blow pipe 85 through delivery pipe 86. Impregnation and expansion of the tobacco material can be continuously performed.

The present invention is not limited to the first to third embodiments described above. Various changes and modifications may be made within the spirit and scope of the invention. In the first embodiment, the pressure of impregnating gas is increased in the path between the preparatory vessel to the impregnation vessel and the pressure of the impregnating gas is reduced in the path between the impregnation vessel and the blow pipe. For this purpose, the rotary valves are used. However, in the second embodiment, the pressure of the impregnating gas is increased and decreased by using ball valves. The rotary valve may be combined with the ball valves to increase and decrease the pressure of the impregnating gas.

In the first embodiment, two rotary valves are inserted between preparatory vessel 7 and impregnation vessel 10 and two rotary valves are inserted between impregnation vessel 10 and blow pipe 85 to increase and decrease the pressure of the impregnating gas. However, in the same manner as in the second embodiment, when the pressure of the impregnating gas in impregnating vessel 10 is set to be a gauge pressure of 15 kg/cm$^2$, only one rotary valve or a one-stage rotary valve can be used to increase and decrease the pressure of the impregnating gas. The present invention is not limited to the number of rotary valves.

Finally, the materials to be expanded in the first to third embodiments are tobacco materials. however, the material used in the expanding apparatus of the present invention is not limited to the tobacco material but can be extended to favorite items (e.g., tea and green tea), vegetables, grains (e.g., rice), or foodstuffs (e.g., seaweed).

The expanding apparatus of the present invention makes it possible to use carbon dioxide as an impregnating material in place of a Freon gas for applying an expanding treatment to a tobacco material. Since the expanding treatment can be applied continuously to a tobacco material by using carbon dioxide, the apparatus of the present invention is highly effective for improving the cigarette productivity and lowering the manufacturing cost of cigarettes.

We claim:
1. An apparatus for expanding material of agricultural origin comprising: an impregnating agent source for storing an impregnating agent to be impregnated in the material to be expanded and capable of assuming at least a gaseous phase;
a preparatory vessel in communication with ambient atmosphere for receiving the material to be expanded;
substituting means for substituting air in said preparatory vessel with a gaseous impregnating agent supplied from said impregnating agent source;
an impregnation vessel for impregnating the material with the impregnating agent
supplying means for supplying to said impregnation vessel the impregnating agent supplied from said impregnating agent source and having an impregnation pressure higher than atmospheric pressure and to thereby create an interior atmosphere within said impregnation vessel that includes the impregnating agent;
convey pipe means for interconnecting said preparatory vessel and said impregnation vessel and for guiding the material to be expanded from said preparatory vessel to said impregnation vessel;
conveying means for conveying the material from said preparatory vessel to said impregnation vessel through said convey pipe means;
booster means for filling said convey pipe means with the impregnating agent supplied from said impregnating agent source and, immediately before the material is received from said convey pipe to said impregnation vessel, for increasing the impregnating agent pressure around said material to a pressure substantially equal to the impregnation pressure in said impregnation vessel while maintaining the impregnation pressure within said impregnating vessel substantially constant;
delivery pipe means, one end of which is connected to said impregnation vessel, for guiding the material impregnated in said impregnation vessel;
a blow pipe, connected to the other end of said delivery pipe, for blowing the impregnated material;
delivering means for delivering the impregnated material from said impregnation vessel to said blow pipe through said delivery pipe means;
debooster means for filling said delivery pipe means with impregnating agent supplied from said impregnating agent source and, immediately before the impregnated material which was discharged from said impregnation vessel to said delivery pipe is then discharged to said blow pipe, for reducing the impregnating agent pressure around said impregnated material to a pressure substantially equal to a pressure in said blow pipe while maintaining the impregnation pressure within said impregnation vessel substantially constant; and blowing means operatively associated with said blow pipe, for generating a flow of a heating medium heated to a predetermined temperature, and for delivering the flow of said heating medium to the impregnated material in said blow pipe.

2. An apparatus according to claim 1, wherein said booster means comprises a rotary valve inserted in said convey pipe means, said rotary valve being provided with a housing having inlet and outlet ports respectively connected to convey pipe portions operatively associated with said preparatory and impregnation vessels, a rotor having a circumferential surface rotatably and air-tightly in slidable contact with an inner surface of said housing, a plurality of pockets formed on said circumferential surface of said rotor at equal intervals, said plurality of pockets being supplied with the material supplied from said convey pipe means through said inlet port together with the impregnating agent and being arranged to discharge the material and the impregnating agent from said outlet port, and supplying means for supplying the impregnating agent to each of said plurality of pockets during movement of said pocket from said inlet port to said outlet port, the pressure of the impregnating agent supplied into said pockets being increased stepwise.

3. An apparatus according to claim 2, wherein said supplying means comprises a plurality of pressure equalizers for sequentially allowing communication between said pockets located between said inlet and outlet ports viewed in a rotational direction of said rotor of said rotary valve and said pockets located between said inlet and outlet ports viewed in a direction opposite to the rotational direction of said rotor during movement of said pockets from said inlet port to said outlet port.

4. An apparatus according to claim 3, wherein said conveying means comprises a screw conveyor, arranged in said preparatory vessel, for feeding out the material from said preparatory vessel to said convey pipe means, a purge path, formed in said housing of said rotary valve, for spraying the gaseous impregnating agent toward a given one of said pockets when said given pocket is connected to said outlet port, and purge gas means for guiding the gaseous impregnating agent having a pressure slightly higher than a pressure in said outlet port from said impregnating agent source to said purge path.

5. An apparatus according to claim 1, wherein said debooster means comprises rotary valve inserted in said delivery pipe, said rotary valve being provided with a housing having inlet and outlet ports respectively connected to delivery pipe portions associated within said impregnating vessel and said blow pipe, a rotor having a circumferential surface rotatably and air-tightly in slidable contact with an inner surface of said housing, a plurality of pockets formed on said circumferential surface of said rotor at equal intervals, said plurality of pockets being supplied with the material supplied from said impregnation vessel through said inlet port together with the impregnating agent and being arranged to discharge the material and the impregnating agent from said outlet port, and supplying means for supplying the impregnating agent to each of said plurality of pockets during movement of said pocket from said inlet port to said outlet port, the pressure of the impregnation agent supplied into said pockets being decreased stepwise.

6. An apparatus according to claim 5, wherein said supplying means comprises a plurality of pressure equalizers for sequentially allowing communication between said pockets located between said inlet and outlet ports viewed in a rotational direction of said rotor of said rotary valve and said pockets located between said inlet and outlet ports viewed in a direction opposite to the rotational direction of said rotor during movement of said pockets from said inlet port to said outlet port.

7. An apparatus according to claim 5, wherein said delivering means comprises a screw conveyor, arranged in said impregnation vessel, for feeding out the material from said impregnation vessel to said delivery pipe, a purge path, formed in said housing of said rotary valve, for spraying the gaseous impregnating agent toward a given one of said pockets when said given pocket is connected to said outlet port, and purge gas means for guiding the gaseous impregnating agent having a pressure slightly higher than a pressure in said outlet port from said impregnating agent source to said purge path.

8. An apparatus according to claim 1, wherein said booster means comprises:

a pair of ball valves, operatively positioned midway along said convey pipe means so as to be spaced apart from each other, for defining therebetween a pressure equalizer chamber within said convey pipe means which may be isolated from said preparatory and impregnation vessels when said pair of ball valves are in a closed position, and for guiding the material from said preparatory vessel to said pressure equalizer chamber or guiding the material from said pressure equalizer chamber to said impregnation vessel when a respective one of said ball valves is in an open position, pressure equalizing means for supplying to said pressure equalizer chamber the impregnating agent having a pressure substantially equal to the impregnation pressure in said impregnation vessel, and discharging means for discharging the impregnating agent from said pressure equalizer chamber and for reducing pressure within said pressure equalizer chamber to a pressure substantially equal to the pressure within said preparatory vessel.

9. An apparatus according to claim 8, wherein said pressure equalizing means fills said pressure equalizer chamber with the impregnating agent having a pressure slightly higher than the impregnation pressure in said impregnation vessel.

10. An apparatus according to claim 1, wherein said debooster means comprises:

a pair of ball valves, operatively positioned midway along said delivery pipe means so as to be spaced apart from each other, for defining therebetween a pressure equalizer chamber within said delivery pipe means which may be isolated from said impregnation vessel and said blow pipe when said pair of ball valves are in a closed position, and for guiding the material from said impregnation vessel to said pressure equalizer chamber or guiding the material from said pressure equalizer chamber to said blow pipe when a respective one of said ball valves is in an open position, pressure equalizing means for supplying to said pressure equalizer chamber the impregnating agent having a pressure substantially equal to the impregnation pressure in said impregnation vessel, and discharging means for discharging the impregnating agent from said pressure equalizer chamber for reducing pressure within said pressure equalizer chamber to a pressure substantially equal to the pressure within said blow pipe.

11. An apparatus according to claim 10, wherein said pressure equalizing means fills said pressure equalizer chamber with the impregnating agent having a pressure slightly lower than the impregnation pressure in said impregnation vessel.

12. An apparatus according to claim 2, further comprising an intermediate vessel, operating positioned in said convey pipe means for temporarily storing the material, said intermediate vessel being filled with the impregnating agent having a medium pressure between a pressure in said preparatory vessel and the impregnation pressure in said impregnation vessel, and wherein said booster means comprises a first rotary valve operatively associated with a portion of said convey pipe means between said impregnation vessel and said intermediate vessel, and a second rotary valve operatively associated with another portion of said convey pipe means between said preparatory vessel and said intermediate vessel.

13. An apparatus according to claim 1, further comprising a cooling jacket which covers an entire outer surface of said impregnation vessel and cooling means for supplying a coolant to said cooling jacket.

14. An apparatus according to claim 1, wherein gaseous carbon dioxide is supplied into said impregnation vessel as the impregnating agent.

15. An apparatus according to claim 1, wherein liquefied carbon dioxide is supplied into said impregnation vessel as the impregnating agent.

16. An apparatus according to claim 15, wherein said impregnation vessel is inclined.

* * * * *